United States Patent Office 3,464,999
Patented Sept. 2, 1969

3,464,999
THIADIAZOLYLISOTHIAZOLES
Raymond Urgel Lemieux and Rintje Raap, Edmonton, Alberta, Canada, assignors to R & L Molecular Research Ltd., Edmonton, Alberta, Canada, a corporation of Canada
No Drawing. Filed July 27, 1967, Ser. No. 656,351
Int. Cl. C07d 91/54
U.S. Cl. 260—302                             3 Claims

ABSTRACT OF THE DISCLOSURE

Various substituted carboxylic acids such as 5-isothiazolylacetic acid are valuable intermediates in the preparation of new and novel antibacterial agents. A new process for the preparation of these acids has been devised, a typical example of which is the reaction of the product from the reaction of isothiazole with butyl lithium with acetic anhydride to produce 5-acetylisothiazole. The 5-acetylisothiazole is reacted with carbethoxyhydrazine to produce the corresponding hydrazone. The resultant hydrazone is treated with thionyl chloride to produce 4-(5'-isothiazolyl)-1,2,3-thiadiazole, which in turn is converted to 1-methylthio-2-(5'-isothiazolyl)-ethyne by treatment first with butyl lithium and then dimethylsulfate. Hydrolysis of this product produces 5-isothiazolylacetic acid. Condensation of this acid with 6-aminopenicillanic acid (6-APA) or 7-aminocephalosporanic acid (7-ACA) produces the corresponding 6-(5'-isothiazolylacetamido) derivatives of penicillanic and cephalosporanic acids.

BACKGROUND OF THE INVENTION

Field of the invention

This invention relates to chemical compounds useful as chemical intermediates in the preparation of valuable antibiotic substances.

Description of the prior art

There exists a need to provide alternate and more efficient methods of producing key intermediates necessary for the preparation of new and valuable antibacterial agents. The new compounds and process for their preparation were heretofore unknown.

SUMMARY OF THE INVENTION

Compounds having the formula

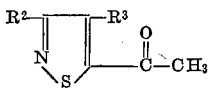

wherein $R^2$ and $R^3$ are alike or different and each represents hydrogen, (lower)alkyl, (lower)alkenyl, (lower)alkoxy, (lower)alkylthio, chloro, fluoro, bromo, iodo, trifluoromethyl, nitro, carboxy or a radical having the formula

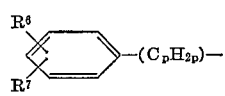

in which $p$ is a whole integer of 0 to 6 inclusive and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy; are prepared by a process which comprises mixing in an inert organic solvent and at a temperature below about 0° C., a compound having the formula

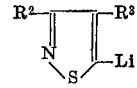

wherein $R^2$ and $R^3$ are as described above, with at least about one equivalent of an acetylating agent selected from acetic anhydride and acetyl halides.

A ketone having the formula

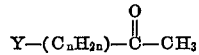

in which $n$ is a whole integer of 0 to 6 inclusive and Y is a radical having the formula H, (lower)alkenyl, (lower)alkynyl, (lower)alkoxy, (lower)alkylthio, carboxy, cyano, carboxamido, substituted carboxamido, carboalkoxy, cycloalkyl containing from 4 to 7 carbon atoms, aryloxy, arylthio, di(lower)alkylamino, acyl, a radical having the formula

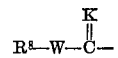

in which W and K may be alike or different and each represents O, S or N–$R^9$, wherein $R^8$ and $R^9$ are alike or different and each represents hydrogen, (lower)alkyl or a radical having the formula

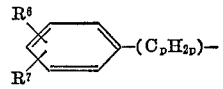

in which $R^5$, $R^7$ and $p$ are as defined above; or Y is a radical, having the formula

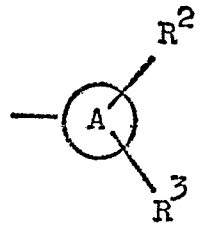

wherein —Ⓐ is a five- or six-membered aromatic ring system, including among others phenyl, pyridyl, pyrazyl, imidazolyl, furyl, thienyl, thiazolyl, isothiazolyl and tetrazolyl, in which $R^2$ and $R^3$ each represent hydrogen, (lower)alkyl, (lower)alkenyl, (lower)alkynyl, (lower)alkoxy, (lower)alkylthio, chloro, fluoro, bromo, iodo, trifluoromethyl, nitro, carboxy, aryl, aralkyl or a radical of the formula

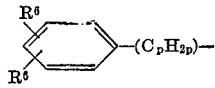

wherein $p$ is as defined above and $R^6$ and $R^7$ each represent hydrogen, (lower)alkyl, (lower)alkenyl, (lower)alkoxy, (lower)alkylthio, chloro, fluoro, bromo, iodo, trifluoromethyl, nitro or carboxy is mixed with a carb-(lower)alkoxyhydrazine, preferably carbethoxyhydrazine to produce a compound having the formula

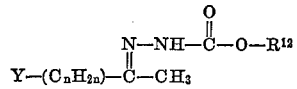

wherein Y is as defined above and $R^{12}$ is (lower-alkyl).

The above isolated compound III is then treated with a thionyl halide, preferably thionyl chloride, to produce a thiadiazole having the formula IV 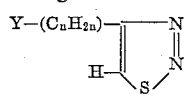

wherein n and Y are as defined above.

A compound having the formula IV is treated with at least one equivalent of an alkyl alkali metal, an aryl alkali metal, an alkali metal hydride, an alkali metal amide, an alkali metal tertiary alkoxide or an alkali metal methylsulfinyl carbanion to produce alkali metal alkynylmercaptides having the formula $$Y-(C_nH_{2n})-C\equiv C-S^\ominus M^\oplus$$
V where $M^\oplus$ is an alkali metal cation, n is an integer from 0 to 6 inclusive, and Y is as described above.

Further treatment of compound V with an alkylating agent produces compounds having the formula $$Y-(C_nH_{2n})-C\equiv C-S-(C_mH_{2m})-R^4$$
VI wherein n and m are whole integers of 0 to 6 inclusive, Y is a radical having the formula H—, (lower)alkenyl, (lower)alkynyl, (lower)alkoxy, (lower)alkylthio, carboxy, cyano, carboxamido, substituted carboxamido, carboalkoxy, cycloalkyl containing from 4 to 7 carbon atoms, aryloxy, arylthio, di(lower)alkylamino, acyl, a radical having the formula

in which K and W may be alike or different and each represents O, S or N—$R^9$,

Wherein $R^8$ and $R^9$ are alike or different and each represents hydrogen, (lower)alkyl or a radical having the formula

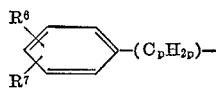

in which $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy, and p is a whole integer of 0 to 6 inclusive;

Or Y is a radical having the formula

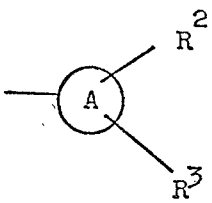

wherein —Ⓐ is a five or six-membered aromatic ring system, including among others phenyl, pyridyl, pyrazyl, imidazolyl, furyl, thienyl, thiazolyl, isothiazolyl and tetrazolyl, In which $R^2$ and $R^3$ each represents hydrogen, (lower)alkyl, (lower)alkenyl, (lower)alkynyl, (lower) alkoxy, (lower) alkylthio, chloro, fluoro, bromo, iodo, trifluoromethyl, nitro, carboxy, or a radical of the formula

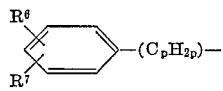

wherein p is as defined above and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy; and When m is an integer of 1 to 6 inclusive, $R^4$ is hydrogen, (lower)alkoxy, (lower)alkylthio, cyano, carboxy, (lower)alkenyl, (lower)alkynyl, carboxamido, substituted carboxamido, carboalkoxy, cycloalkyl containing from 4 to 7 carbon atoms, a radical of the formula

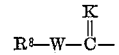

in which W and K may be alike or different and each represents O, S, or N—$R^9$, wherein $R^8$ and $R^9$ are alike or different and each represents hydrogen, (lower)alkyl or a radical having the formula

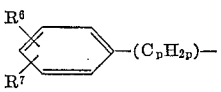

in which p is a whole integer of 0 to 6 inclusive and $R^6$ and $R^7$ are alike or different and each represents hydrogen, (lower)alkyl, (lower)alkenyl, (lower)alkoxy, (lower) alkylthio, chloro, fluoro, bromo, iodo, trifluoromethyl, nitro or carboxy; or $R^4$ is a radical having the formula

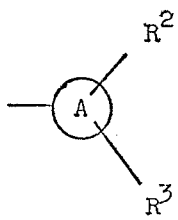

wherein —Ⓐ is a five- or six-membered aromatic ring system including among others phenyl, pyridyl, pyrazyl, imidazolyl, furyl, thienyl, thiazolyl, isothiazolyl and tetrazolyl, Wherein $R^2$ and $R^3$ are as defined above; or when m is zero, $R^4$ is a radical having the formula

wherein X' may be O or S and $R^{10}$ is (lower)alkyl, aryl, (lower)alkenyl, (lower)alkynyl, cycloalkyl, benzyl, phenethyl, (lower)alkoxy, aryloxy, (lower)alkylthio, arylthio, cycloalkyloxy, dialkylamino, cycloalkylamino, or a radical having the formula

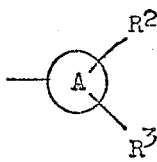

wherein —Ⓐ, $R^2$ and $R^3$ are as defined above.

Hydrolysis of the compounds having the Formula VI produces the substituted carboxylic acids which are used in the production of antibacterial agents.

This invention relates to novel compounds. More particularly, this invention relates to novel compounds which are useful as intermediates in the preparation of therapeutically active penicillins and cephalosporins, and to the processes for preparing such compounds.

It is an object of the present invention to provide chemical intermediates which can be easily converted to penicillins and cephalosporins and other therapeutically useful substances. It is another object of the present invention to provide a novel process for the preparation of these compounds.

The main objective of the present invention is the synthesis of valuable key intermediates in the ultimate synthesis of compounds, i.e., 5-isothiazolylacetic acid, which in turn are utilized in the preparation of the above mentioned antibacterial agents.

The primary objective of the present invention is to prepare intermediates that are readily converted into compounds having the formula

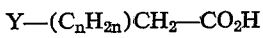

wherein $n$ is an integer from 0 to 6 inclusive, and Y is hydrogen, (lower)alkenyl, (lower) alkynyl, (lower)alkoxy, (lower)alkylthio, carboxy, cycloalkyl containing from 4 to 7 carbon atoms, acyl, aryloxy, arylthio, di(lower)alkylamino or a radical having the formula

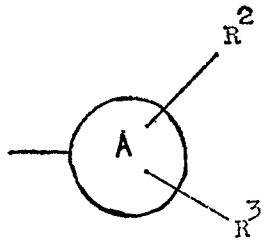

wherein —Ⓐ is a five or six membered aromatic ring system, including among others phenyl, pyridyl, pyrazyl, imidazolyl, furyl, thienyl, thiazolyl, isothiazolyl, and tetrazolyl, in which $R^2$ and $R^3$ are alike or different and each represent hydrogen, (lower)alkyl, (lower)alkenyl, (lower)alkynyl, (lower)alkoxy, (lower)alkylthio, chloro, fluoro, bromo, iodo, trifluoromethyl, nitro, carboxy, aryl, aralkyl or a radical of the formula

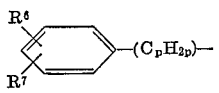

wherein $p$ is a whole integer of 0 to 6 inclusive and $R^6$ and $R^7$ each represent hydrogen, (lower)alkyl, (lower)alkenyl, (lower)alkoxy, (lower)alkylthio, chloro, fluoro, bromo, iodo, trifluoromethyl, nitro or carboxy.

Cephalosporin and penicillin derivatives such as 7-(5-isothiazolylacetamido)cephalosporanic acid and 6-(5-isothiazolylacetamido)penicillanic acid are prepared from the novel acids of this invention by reaction of 7-aminocephalosporanic acid and 6-aminopenicillanic acid, respectively, preferably in the form of a neutral salt such as the sodium salt or the triethylamine salt with an active ester, e.g., 2,4-dinitrophenyl ester or the p-nitrophenyl ester of an acid of Formula I, or with its functional equivalent as an acylating agent for a primary amino group. Such equivalents include the corresponding carboxylic chlorides, bromides, acid anhydrides, including mixed anhydrides and particularly the mixed anhydrides prepared from stronger acids such as the lower aliphatic monoesters of carbonic acid of alkyl and aryl sulfonic acids and of more hindered acids such as diphenylacetic acid. In addition, the free acid itself may be coupled with 7-ACA or 6-APA by the use of enzymes or of a carbodiimide reagent [cf. Sheehan and Hess, J. Amer. Chem. Soc. 77, 1067 (1955)]. Another equivalent of the 2,4-dinitrophenyl and p-nitrophenyl esters is a corresponding azolide, i.e., an amide of the corresponding acid whose amide nitrogen is a member of a quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for carrying out these reactions to produce a penicillin or a cephalosporin and the methods used to isolate the penicillin or cephalosporin so-produced are well known in the art.

Included within the scope of the master process is the procedure of producing compounds having the formula

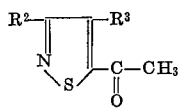

wherein $R^2$ and $R^3$ each represent hydrogen, (lower)alkyl, (lower)alkenyl, (lower)alkynyl, (lower)alkoxy, (lower)alkylthio, chloro, fluoro, bromo, iodo, trifluoromethyl, nitro, carboxy, aryl, aralkyl or a radical of the formula

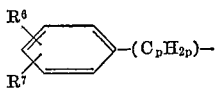

wherein $p$ is a whole integer of 0 to 6 inclusive and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy. In the practice of the invention, an isothiazole having the formula

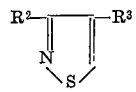

wherein $R^2$ and $R^3$ are as defined above, is treated with an alkyl alkali metal ($M^+$), i.e., butyl lithium, to produce a 5-isothiazolyl lithium. The isothiazolyl lithium compound is further treated with acetic anhydride or acetyl halide to produce a compound having the Formula I.

Schematically, the reaction sequence may be illustrated as below:

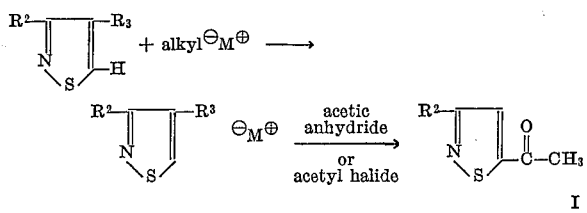

Compound I is usually prepared by dissolving the compound Ia in a reaction-inert solvent such as tetrahydrofuran, n-hexane, or the like. To this solution is added dropwise, an excess, usually a 10% excess, of an alkyl alkali metal, i.e., butyl lithium, phenyl lithium, or the like, with rapid stirring at temperatures usually below 0° C. and preferably below −60° C. The reaction is usually carried out in a nitrogen atmosphere and under anhydrous conditions. A suspension of the isothiazole lithium usually forms and is cautiously transferred into a vigorously stirred mixture of acetic anhydride or acetyl halide and ether which is cooled in a Dry Ice-acetone mixture. The reaction mixture is allowed to warm up to 0°–25° C. and is poured into ice water. The aqueous layer is extracted with several portions of ether and combined with the ether phase of the initial separation. Following drying over anhydrous sodium sulfate, the solvent is removed in vacuo. The residue is then purified by crystallization or distillation under reduced pressure to produce a purified compound,

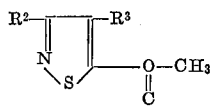

An integral part of the present process is the treatment of compounds having the formula

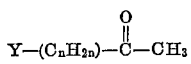

in which $n$ is a whole integer of 0 to 6 inclusive and Y is a radical having the formula H, (lower)alkenyl, (lower)alkynyl, (lower)alkoxy, (lower)alkylthio, carboxy, cyano, carboxamido, substituted carboxamido, carboalkoxy, cycloalkyl containing from 4 to 7 carbon atoms, aryloxy, arylthio, di(lower)alkylamino, acyl, a radical having the formula

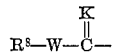

in which W and K may be alike or different and each represents O, S or N—R$^9$.

Wherein R$^8$ and R$^9$ are alike or different and each represents hydrogen, (lower)alkyl or a radical having the formula

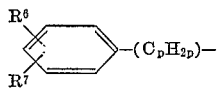

in which R$^6$, R$^7$ and $p$ are as defined above; or Y is a radical, having the formula

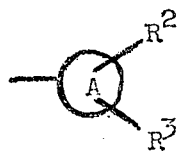

wherein —Ⓐ is a five or six membered aromatic ring system, including among others phenyl, pyridyl, pyrazyl, imidazolyl, furyl, thienyl, thiazolyl, isothiazolyl and tetrazolyl.

In which R$^2$ and R$^3$ each represent hydrogen, (lower)alkyl, (lower)alkenyl, (lower)alkynyl, (lower)alkoxy, (lower)alkylthio, chloro, fluoro, bromo, iodo, trifluoromethyl, nitro, carboxy, aryl, aralkyl or a radical of the formula

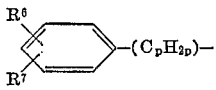

wherein $p$ is as defined above and R$^6$ and R$^7$ each represent hydrogen, (lower)alkyl, (lower)alkenyl, (lower)alkoxy, (lower)alkylthio, chloro, fluoro, bromo, iodo, trifluoromethyl, nitro or carboxy with a carb-(lower)alkoxyhydrazine, preferably carbethoxyhydrazine to produce a compound having the formula

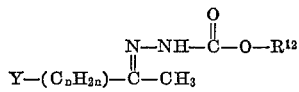

wherein Y is as defined above and R$^{12}$ is (lower)alkyl.

Schematically the reaction sequence may be illustrated as below:

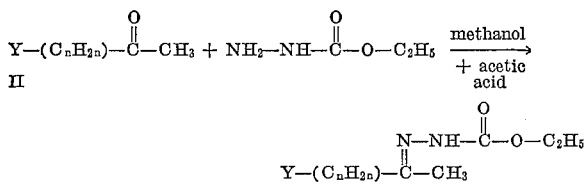

The carbethoxyhydrazino compound III is usually prepared by heating together an approximately equimolar quantity of carbethoxyhydrazine and compound II dissolved in a polar solvent such as methanol, ethanol, propanol, and the like, but preferably methanol, along with a catalytic quantity of acetic acid. After heating to the boiling point of the methanol, the reaction mixture is allowed to cool slowly to room temperature. Ether is usually added to the solidified mixture and after cooling in ice, a solid is collectable by filtration. The isolated product III is usually recrystallizable from an organic solvent such as ethyl acetate, ether-ethyl acetate, or the like.

The above isolated compound III is then treated with a thionyl halide, preferably thionyl chloride, to produce a thiadiazole having the formula

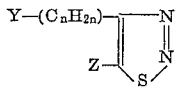

wherein Z is hydrogen or methyl and $n$ is a whole integer of 0 to 6 when Z is hydrogen; but $n$ in an integer of 0 to 5 when Z is methyl, and Y is as defined above.

When in compound II, $n$ is an integer of one or more, a mixture of two thiadiazoles (IVa and IVb) may be obtained.

Schematically the reaction sequence may be illustrated as below:

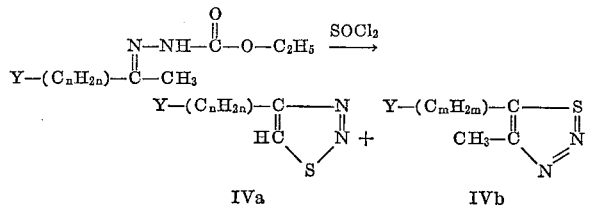

wherein,

Y and $n$ are as described above and $m$ is a whole integer of 0 to 5.

The mixture is a result of the condensation reaction occurring on either the α'-methylene carbon (IVb) or the α methyl carbon (IVa).

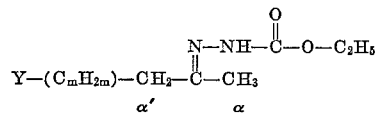

However, when in compound II $n$ is zero and Y is hydrogen, methyl, carboxy, cyano, carboxamido, substituted carboxamido, carboalkoxy, a radical having the formula

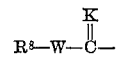

in which W and K may be alike or different and each represents O, S or N—R$^9$, wherein R$^8$ and R$^9$ are as described above, or Y is a radical having the formula

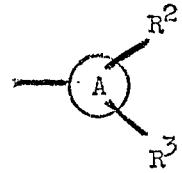

wherein—Ⓐ is a five or six-membered aromatic ring including among others, phenyl, pyridyl, pyrazyl, imidazolyl, furyl, thienyl, thiazolyl, isothiazolyl, and tetrazolyl, In which R$^2$ and R$^3$ are alike or different and each represent hydrogen, (lower)alkyl, (lower)alkenyl, (lower)alkynyl, (lower)alkoxy, (lower)alkylthio, chloro, fluoro, bromo, iodo, trifluoromethyl, nitro, carboxy, aryl, aralkyl or a radical of the formula

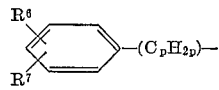

wherein $p$ is a whole integer of 0 to 6 inclusive and R$^6$ and R$^7$ each represent hydrogen, (lower)alkyl, (lower)alkenyl, (lower)alkoxy, (lower)alkylthio, chloro, fluoro, bromo, iodo, trifluoromethyl, nitro or carboxy; there is obtained but one 1,2,3-thiadiazole, that equivalent to a compound having the Formula IVa.

The 1,2,3-thiadiazoles are usually prepared by placing compound III into about a 5 to 50 molar excess, but preferably about a 10 molar excess of thionyl chloride at about room temperature. The red-colored solution is heated slightly and a vigorous reaction ensues with the evolution of gas. The solution usually turns green in color.

When the reaction subsides after about twenty to forty minutes, the reaction mixture is heated at about 40° C. to 70° C. for about 2 hours. After cooling the excess of thionyl chloride is removed by distillation. The crude reaction product can be purified by standard methods such as washing with an aqueous sodium bicarbonate solution, elution chromatography over alumina and recrystallization from a solvent such as ethyl acetate, or by distillation.

When in compound III, n is 1 to 6 inclusive, a mixture of 1,2,3-thiadiazoles (IVa and IVb) is produced, the mixture can usually be resolved into its component parts by such methods as crystallization, chromatography, reduced pressure distillation, liquid-liquid partition, and the like.

In the process of the present invention, 1,2,3-thiadiazole of Formula IVa is treated with an excess, but preferably about one equivalent amount of an alkyl alkali metal, i.e. butyl lithium, an aryl alkali metal, i.e. phenyl lithium, an alkali metal hydride, i.e., sodium hydride, an alkali metal amide, i.e., sodamide, an alkali metal tertiary alkoxide, i.e., potassium tert-butoxide or an alkali metal tertiary alkoxide, i.e., potassium tert-butoxide or an alkali metal sulfinyl carbanion, i.e. sodium methylsulfinyl carbanion in an inert organic solvent and at a temperature below 0° C., but preferably below —50° C., to produce a compound having the formula $$Y\text{---}(C_nH_{2n})\text{---}C\equiv C\text{---}S^{\ominus}M^{\oplus} \quad\quad V$$

wherein $n$ is an integer from 0 to 6 inclusive, M is an alkali metal cation such as lithium, sodium, potassium and Y is hydrogen, (lower)alkenyl, (lower)alkynyl, (lower)alkoxy, (lower)alkylthio, carboxy, cyano, carboxamido, substituted carboxamido, carboalkoxy, cycloalkyl containing from 4 to 7 carbon atoms, acyl, aryloxy, arylthio, di(lower)alkylamino, or a radical having the formula

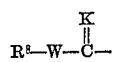

in which W and K may be alike or different and each represents O, S, or N—$R^9$, wherein $R^8$ and $R^9$ are alike or different and each represents hydrogen, (lower)alkyl or a radical having the formula

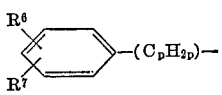

in which $p$ is a whole integer of 0 to 6 inclusive and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy; or Y is a radical having the formula

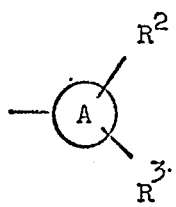

wherein —(A) is a five or six membered aromatic ring system including among others phenyl, pyridyl, pyrazyl, imidazolyl, furyl, thienyl, thiazolyl, isothiazolyl and tetrazolyl;

Wherein $R^2$ and $R^3$ each represent hydrogen, (lower)alkyl, (lower)alkenyl, (lower)alkynyl, (lower)alkoxy, (lower)alkylthio, chloro, fluoro, bromo, iodo, trifluoromethyl, nitro, carboxy, or a radical of the formula

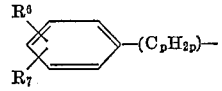

wherein $p$ is a whole integer of 0 to 6 inclusive and $R^6$ and $R^7$ each represent hydrogen, (lower)alkyl, (lower)alkenyl, (lower)alkoxy, (lower)alkylthio, chloro, fluoro, bromo, iodo, trifluoromethyl, nitro or carboxy.

Schematically the reaction sequence may be illustrated as below:

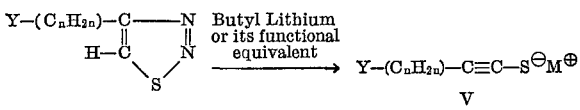

The product having the Formula V generally forms as a suspension in the above described procedure. While it can be identified as illustrated, it is not necessarily isolated as such but is usually further treated in situ with at least one equivalent of an alkali metal-displacing alkylating agent to produce compounds having the formula $$Y\text{---}(C_nH_{2n})\text{---}C\equiv C\text{---}S\text{---}(C_mH_{2m})\text{---}R^4 \quad\quad VI$$

wherein $n$ and $m$ are whole integers of 0 to 6 inclusive, Y is a radical having the Formula H—, (lower)alkenyl, (lower)alkynyl, (lower)alkoxy, (lower)alkylthio, carboxy, cyano, carboxamido, substituted carboxamido, carboalkoxy, cycloalkyl containing from 4 to 7 carbon atoms, aryloxy, arylthio, di(lower)alkylamino, acyl, a radical having the formula

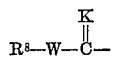

in which K and W may be alike or different and each represents O, S or N—$R^9$,

Wherein $R^8$ and $R^9$ are alike or different and each represents hydrogen, (lower)alkyl or a radical having the formula

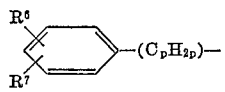

in which $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy, and $p$ is a whole integer of 0 to 6 inclusive;

or Y is a radical having the formula

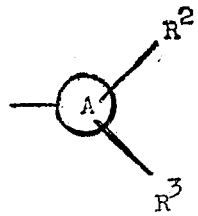

wherein —(A) is a five or six membered aromatic ring system, including among others phenyl, pyridyl, pyrazyl, imidazolyl, furyl, thienyl, thiazolyl, isothiazolyl and tetrazolyl, In which $R^2$ and $R^3$ each presents hydrogen, (lower)alkyl, (lower)alkenyl, (lower)alkylnyl, (lower)alkoxy, (lower)alkylthio, chloro, fluoro, bromo, iodo, trifluoromethyl, nitro, carboxy, or a radical of the formula

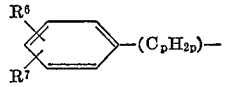

wherein $p$ is as defined above and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy; and When $m$ is an integer of 1 to 6 inclusive, $R^4$ is hydrogen, (lower)alkoxy, (lower)alkylthio, cyano, carboxy, (lower)alkenyl, (lower)alkynyl, carboxamido, substituted carboxamido, carboalkoxy, cycloalkyl, containing from 4 to 7 carbon atoms, a radical of the formula

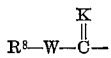

in which W and K may be alike or different and each represents O, S or N—$R^9$, wherein $R^8$ and $R^9$ are alike or different and each represents hydrogen, (lower)alkyl or a radical having the formula

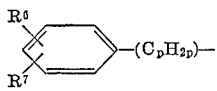

in which $p$ is a whole integer of 0 to 6 inclusive and $R^6$ and $R^7$ are alike or different and each represents hydrogen, (lower)alkyl, (lower)alkenyl, (lower)alkoxy, (lower)alkythio, chloro, fluoro, bromo, iodo, trifluoromethyl, nitro or carboxy; or $R^4$ is a radical having the formula

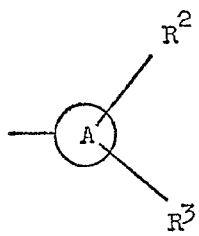

wherein —Ⓐ is a five or six member aromatic ring system including among others phenyl, pyridyl, pyrazyl, imidazolyl, furyl, thienyl, thiazolyl, isothiazolyl and tetrazolyl, wherein $R^2$ and $R^3$ are as defined above; or when $m$ is zero $R^4$ is a radical having the formula

wherein X′ may be O or S and $R^{10}$ is (lower)alkyl, aryl, (lower)alkenyl, (lower)alkynyl, cycloalkyl, benzyl, phenethyl, (lower)alkoxy, aryloxy, (lower)alkylthio, arylthio, cycloalkyloxy, dialkylamino, cycloalkylamino, or a radical having the formula

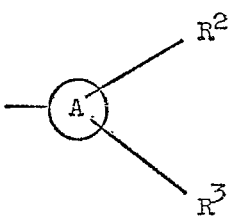

wherein —Ⓐ, $R^2$ and $R^3$ are as defined above.

The alkali metal-displacing alkylating agent is a di-(lower)alkylsulfate or a compound having the formula $$R^4\text{—}(C_mH_{2m})\text{—}X$$

wherein $R^4$ and $m$ are as described above and X is chloro, bromo, iodo, or a radical of the formula $$R\text{—}SO_3\text{—}$$

in which R is (lower)alkyl, benzyl, phenethyl, phenyl, p-halo-phenyl, or p-(lower)alkylphenyl.

Schematically the reaction sequence may be illustrated as below:

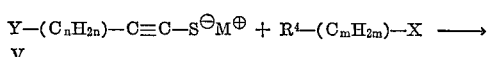
V
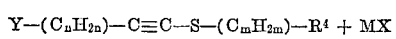
VI in which Y, $n$, $m$, $M^\oplus$, $R^4$ and X are as described above.

Under normal procedure, a 10% excess of butyl lithium in n-hexane is added to a stirred tetrahydrofuran suspension of compound IVa cooled in a Dry-Ice-acetone bath at a rate slow enough to keep the temperature maintained below −60° C. The addition is performed under a nitrogen atmosphere. When completed, the reaction mixture is stirred an additional 10 minutes, following which time an equimolar quantity of an alkali metal-displacing alkylating agent as defined above, is added in one portion. The reaction mixture is allowed to warm to about 0° C. and it is poured into ice water. The product is extracted with three portions of ether. The ether extracts are combined and dried over magnesium sulfate. Evaporation in vacuo gives a residue which is either purified by crystallization or distillation under reduced pressure to yield compounds having Formula VI.

Compounds having the Formula VI are readily converted to product having the formula $$Y\text{—}(C_nH_{2n})\text{—}CH_2\text{—}CH_2H \qquad IX$$

by hydrolysis.

Schematically, the reaction sequence may be illustrated as below:

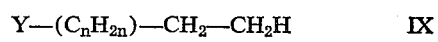
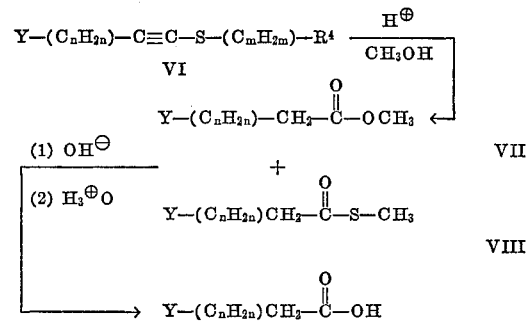

The usual procedure is to heat at reflux temperatures a mixture of compound VI, methanol and 3 N sulfuric acid for about 5 hrs. Remove the methanol in vacuo and extract the intermediate esters (VII and VIII) with ether. The combined ether extracts are dried and the ether removed in vacuo to give an oily semi-solid or liquid which is characterized as material having Formulas VII and VIII. The products VII and VIII are dissolved in methanol to which solution is added about a 20% molar excess of 3 N sodium hydroxide in methanol. The mixture usually darkens in color. When the mixture has stood at room temperature for about three to five hours, the methanol is removed in vacuo and the residue is dissolved in water. The aqueous solution is washed once with ether, layered with ethyl acetate and acidified with 3 N sulfuric acid to pH 6.0 or lower. The aqueous layer is further extracted with ethyl acetate and the extracts combined, dried over sodium sulfate, decolorized with charcoal, filtered and the solution is concentrated sufficiently to allow product of Formula IX to crystallize.

As mentioned previously, these acids (IX) are most valuable intermediates in the preparation of potent antibacterial agents such as the semi-synthetic penicillins and cephalosporins. The acids are generally converted to their acid halides, preferably acid chloride, or its functional equivalent for acylating a primary amine, and treated with either 6-aminopenicillanic acid or 7-aminocephalosporanic acid to produce semi-synthetic penicillins or cephalosporins.

A preferred embodiment is the process for the preparation of compounds having the formula

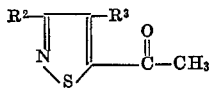

wherein $R^2$ represents hydrogen, (lower)alkyl or carboxy and $R^3$ represents hydrogen, chloro, bromo, fluoro, iodo, (lower)alkyl or carboxy; which process comprises mixing, in an inert organic solvent, at a temperature below about —60° C., a compound having the formula

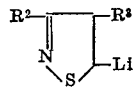

wherein $R^2$ and $R^3$ are as described above, with at least one equivalent of an acetylating agent selected from acetic anhydride or an acetyl halide, preferably acetyl chloride.

A more preferred embodiment is the process, as described above, for the preparation of a compound of the formula

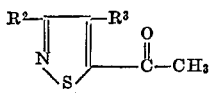

in which $R^2$ and $R^3$ are both hydrogen and the acetylating agent is acetic anhydride.

Another preferred embodiment of the present invention is a compound of the formula

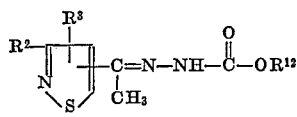

wherein $R^2$ represents hydrogen, (lower)alkyl or carboxy, $R^3$ represents hydrogen, chloro, fluoro, bromo, iodo, (lower)alkyl or carboxy and $R^{12}$ represents (lower)alkyl.

A most preferred embodiment is a compound having the formula

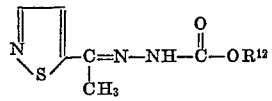

in which $R^{12}$ represents $CH_3$— or $C_2H_5$—.

Another preferred embodiment of the present invention is the compound having the formula

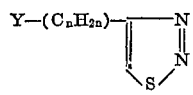

in which $n$ is a whole integer of 0 to 6 inclusive and Y is a radical having the formula $CH_3$—, (lower)alkenyl, (lower)alkynyl, (lower)alkoxy, (lower)alkylthio, carboxy, cyano, carboxamido, substituted carboxamido, carboalkoxy, cycloalkyl containing from 4 to 7 carbon atoms, aryloxy, arylthio, di(lower)alkylamino, acyl, a radical having the formula.

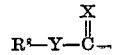

in which X and Y may be alike or different and each represents O, S or N—$R^9$,
wherein $R^8$ and $R^9$ are alike or different and each represents hydrogen, (lower)alkyl or a radical having the formula

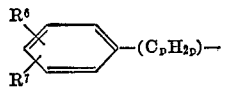

in which $R^6$, $R^7$ and $p$ are as defined above; or Y is a radical, having the formula

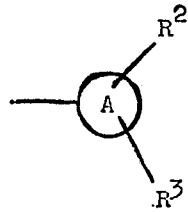

wherein —Ⓐ is a five or six membered aromatic ring system, including among others phenyl, pyridyl, pyrazyl, imidazolyl, furyl, thienyl, thiazolyl, isothiazolyl and tetrazolyl, In which $R^2$ and $R^3$ each represent hydrogen, (lower)alkyl, (lower)alkenyl, (lower)alkynyl, (lower)alkoxy, (lower)alkylthio, chloro, fluoro, bromo, iodo, trifluoromethyl, nitro, carboxy, aryl, aralkyl or a radical of the formula

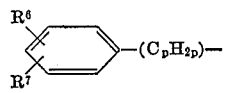

wherein $p$ is as defined above and $R^6$ and $R^7$ each represent hydrogen, (lower)alkyl, (lower)alkenyl, (lower)alkoxy, (lower)alkylthio, chloro, fluoro, bromo, iodo, trifluoromethyl, nitro or carboxy.

A more preferred embodiment is a compound having the formula

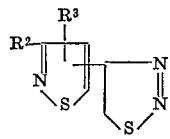

wherein $R^2$ represents hydrogen, (lower)alkyl or carboxy, $R^3$ represents hydrogen, chloro, fluoro, bromo, iodo, (lower)alkyl or carboxy.

A most preferred embodiment is a compound having the formula

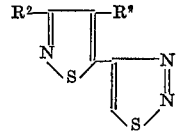

wherein $R^2$ and $R^3$ are both hydrogen.

Another preferred embodiment of the present invention is the process for the preparation of compounds having the formula

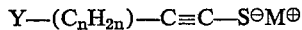

wherein $M^\oplus$ is an alkali metal cation, $n$ is an integer from 0 to 6 inclusive, and Y is a radical having the Formula H, (lower)alkenyl, (lower)alkynyl, (lower)alkoxy, (lower)alkylthio, carboxy, cyano, carboxamido, substituted carboxamido, carboalkoxy, cycloalkyl containing from 4 to 7 carbon atoms, aryloxy, arylthio, di(lower)alkylamino, acyl, a radical having the formula

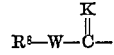

in which W and K may be alike or different and each represents O, S or N—$R^9$,
wherein $R^8$ and $R^9$ are alike or different and each represents hydrogen, (lower)alkyl or a radical having the formula

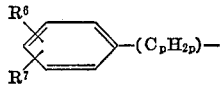

in which $R^6$, $R^7$ and $p$ are as defined previously; or Y is a radical, having the formula

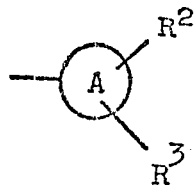

wherein —Ⓐ is a five or six membered aromatic ring system, including among others phenyl, pyridyl, pyrazyl, imidazolyl, furyl, thienyl, thiazolyl, isothiazolyl and tetrazolyl, In which $R^2$ and $R^3$ each represent hydrogen, (lower) alkyl, (lower)alkenyl, (lower)alkynyl, (lower)alkoxy, (lower)alkylthio, chloro, fluoro, bromo, iodo, trifluoromethyl, nitro, carboxy, or a radical of the formula

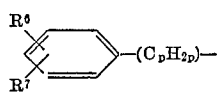

wherein $p$ is as defined above and $R^6$ and $R^7$ each represent hydrogen, (lower)alkyl, (lower)alkenyl, (lower) alkoxy, (lower)alkylthio, chloro, fluoro, bromo, iodo, trifluoromethyl, nitro or carboxy; which process comprises mixing, in an inert organic solvent and at a temperature below about 0° C., but preferably below —50° C., a compound having the formula

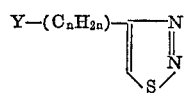

wherein Y and $n$ are as described above, with at least one equivalent of an alkyl alkali metal, an aryl alkali metal, an alkali metal hydride, an alkali metal amide, an alkali metal tertiary alkoxide or an alkali metal methylsulfinyl carbanion.

A more preferred embodiment is the process for the preparation of compounds having the formula $$Y—(C_nH_{2n})—C\equiv C—S^\ominus M^\oplus$$

wherein $n$ and $M^\oplus$ are as defined above and in which Y is H—, carboxy, carboalkoxy, carboxamido, or a radical having the formula

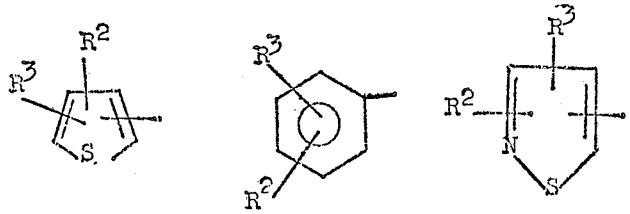

wherein $R^2$ and $R^3$ are as described above.

A much more preferred embodiment is the process for the preparation of compounds having the formula $$Y—C\equiv C—S^\ominus M^\oplus$$

wherein $M^\oplus$ is an alkali metal cation, and Y is a radical having the formula

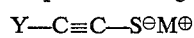

in which $R^2$ represents hydrogen, (lower)alkyl or carboxy and $R^3$ represents hydrogen, chloro, fluoro, bromo, iodo, (lower)alkyl or carboxy.

A most preferred embodiment is the process for the preparation of compounds having the formula

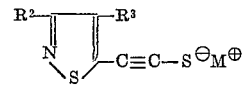

wherein $R^2$ and $R^3$ are both hydrogen and $M^\oplus$ is a lithium, potassium or sodium cation.

Another preferred embodiment of the present invention is the process for the preparation of compounds having the formula $$Y—(C_nH_{2n})—C\equiv C—S—(C_mH_{2m})—R^4$$

wherein $n$ and $m$ are whole integers of 0 to 6 inclusive, Y is a radical having the formula H—, (lower)alkenyl, (lower)alkynyl, (lower)alkoxy, (lower)alkylthio, carboxy, cyano, carboxamido, substituted carboxamido, carboalkoxy, cycloalkyl containing from 4 to 7 carbon atoms, aryloxy, arylthio, di(lower)alkylamino, acyl, a radical having the formula

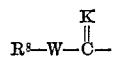

in which W and K may be alike or different and each represents O, S or N—$R^9$, wherein $R^8$ and $R^9$ are alike or different and each represents hydrogen, (lower)alkyl or a radical having the formula

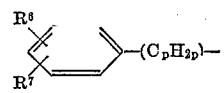

in which $R^6$, $R^7$ and $p$ are as defined above; or Y is a radical, having the formula

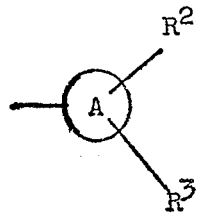

wherein —Ⓐ is a five or six membered aromatic ring system, including among others phenyl, pyridyl, pyrazyl, imidazolyl, furyl, thienyl, thiazolyl, isothiazolyl and tetrazolyl, In which $R^2$ and $R^3$ each represent hydrogen, (lower) alkyl, (lower)alkenyl, (lower)alkynyl, (lower)alkoxy,

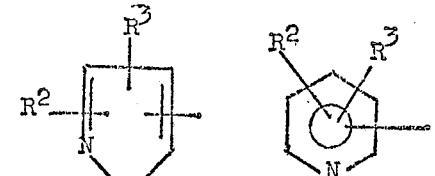

(lower)alkylthio, chloro, fluoro, bromo, iodo, trifluoromethyl, nitro, carboxy, aryl, aralkyl or a radical of the formula

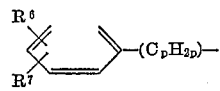

where $p$ is as defined above and $R^6$ and $R^7$ each represent hydrogen, (lower)alkyl, (lower)alkenyl, (lower)alkoxy, (lower)alkylthio, chloro, fluoro, bromo, iodo, trifluoromethyl, nitro or carboxy; and When $m$ is an integer of 1 to 6 inclusive, $R^4$ is hydrogen, (lower)alkoxy, (lower)alkylthio, cyano, carboxy, (lower)alkenyl, (lower)alkynyl, carboxamido, substituted carboxamido, carboalkoxy, cycloalkyl containing from 4 to 7 carbon atoms, a radical of the formula

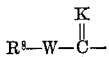

in which K and Y may be alike or different and each represents O, S or N–$R^9$, wherein $R^8$ and $R^9$ are alike or different and each represents hydrogen, (lower)alkyl or a radical having the formula

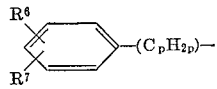

in which $p$ is a whole integer of 0 to 6 inclusive and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy; or $R^4$ is a radical having the formula

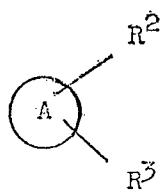

wherein —Ⓐ is a five or six membered aromatic ring system including among others phenyl, pyridyl, pyrazyl, imidazolyl, furyl, thienyl, thiazolyl, isothiazolyl and tetrazolyl Wherein $R^2$ and $R^3$ each represent hydrogen, (lower)alkyl, (lower)alkenyl, (lower)alkynyl, (lower)alkoxy, (lower)alkylthio, chloro, fluoro, bromo, iodo, trifluoromethyl, nitro, carboxy, aryl, aralkyl or a radical of the formula

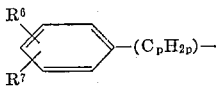

wherein $p$ is a whole integer of 0 to 6 inclusive and $R^6$ and $R^7$ each represent hydrogen, (lower)alkyl, (lower)alkenyl, (lower)alkoxy, (lower)alkylthio, chloro, fluoro, bromo, iodo, trifluoromethyl, nitro, carboxy; or when $m$ is zero $R^4$ is a radical having the formula

wherein X′ may be O or S and $R^{10}$ is (lower)alkyl, aryl, (lower)alkenyl, (lower)alkynyl, cycloalkyl, benzyl, phenethyl, (lower)alkoxy, aryloxy, (lower)alkylthio, arylthio, cycloalkyloxy, dialkylamino, cycloalkylamino, or a radical having the formula

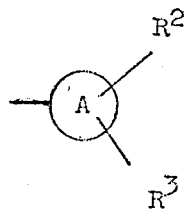

wherein —Ⓐ, $R^2$ and $R^3$ are as defined above.

Which process comprises

Mixing, in an inert organaic solvent and at a temperature below about 0° C., a compound having the formula

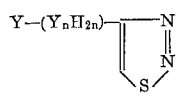

wherein Y and $n$ are as described above, with at least one equivalent of an alkyl alkali metal, an aryl alkali metal, an alkali metal hydride, an alkali metal amide, an alkali metal tertiary alkoxide or an alkali metal methylsulfinyl carbanion; and then mixing the resulting reaction mixture with at least about one equivalent of a di(lower)alkyl sulfate or an alkali metal-displacing alkylating agent having the formula $$R^4—(C_mH_{2m})—X$$

wherein $R^4$ and $m$ are as described above and X is chloro, bromo iodo, or a radical of the formula $$R—SO_3—$$

in which R is (lower)alkyl, benzyl, phenethyl, phenyl, p-halophenyl or p-(lower)alkylphenyl.

A more preferred embodiment is the process as described above for the preparation of compounds having the formula $$Y—(C_nH_{2n})—C≡C—S—(C_mH_{2m})—R^4$$

wherein Y is hydrogen, (lower)alkyl, carboxy or a radical having the formula

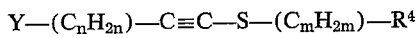

in which $R^2$, $R^3$, $n$, $m$ and $R^4$ are as described above.

A much more preferred embodiment is the process for the preparation of compounds having the formula $$Y—(C_nH_{2n})—C≡C—S(C_mH_{2m})—R^4$$

wherein Y is a radical having the formula

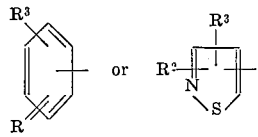

in which $n$ is zero, $m$ is as described above, $R^2$ represents hydrogen (lower)alkyl or carboxy and $R^3$ represents hydrogen, chloro, fluoro, bromo, iodo, (lower)alkyl or carboxy, and $R^4$ is as described above.

A most preferred embodiment is the process for the preparation of compounds having the formula $$Y—C≡C—S—(C_mH_{2m})—R^4$$

wherein $m$ is as described above and Y is a radical of the formula

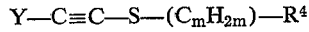

in which $R^2$ represents hydrogen, (lower)alkyl or carboxy and $R^3$ represents hydrogen, chloro, fluoro, bromo, iodo, (lower)alkyl or carboxy, $R^4$ is hydrogen, phenyl, or a radical of the formula

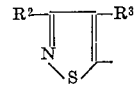

in which $R^8$ is (lower)alkyl.

A most preferred embodiment is the process for the preparation of compounds having the formula

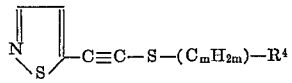

wherein $R^4$ is hydrogen, phenyl, or a radical of the formula

in which $R^8$ is (lower)alkyl.

Another preferred embodiment of the present invention is a compound having the formula

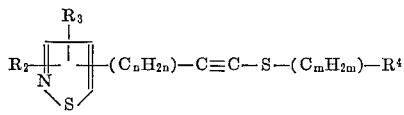

wherein $R^2$ and $R^3$ each represent hydrogen, (lower)alkyl, (lower)alkenyl, (lower)alkynyl, (lower)alkoxy, (lower)alkylthio, chloro, bromo, fluoro, iodo, trifluoromethyl nitro, carboxy, or a radical of the formula

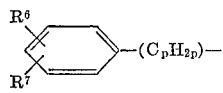

wherein $p$ is a whole integer of 1 to 6 inclusive and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy; or $R^2$ and $R^3$ are a radical of the formula

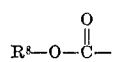

in which $R^8$ is hydrogen, (lower)alkyl, phenyl, benzyl, phenethyl, p-halophenyl or p-(lower)alkylphenyl;

$n$ and $m$ are whole integers of 0 to 6 inclusive;

When $m$ is an integer of 1 to 6 inclusive, $R^4$ is hydrogen, (lower)alkoxy, (lower)alkylthio, cyano, carboxy, (lower)alkenyl, (lower)alkynyl, carboxamido, substituted carboxamido, carboalkoxy, cycloalkyl containing from 4 to 7 carbon atoms, a radical of the formula

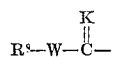

in which W and K may be alike or different and each represents O, S, or N—$R^9$, wherein $R^8$ and $R^9$ are alike or different and each represents hydrogen, (lower)alkyl or a radical having the formula

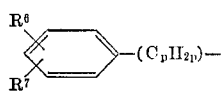

in which $p$ is a whole integer of 0 to 6 inclusive and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy; or $R^4$ is a radical having the formula

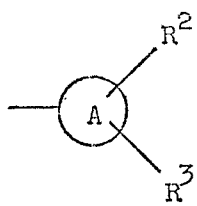

wherein —Ⓐ is a five or six membered aromatic ring system including among others phenyl, pyridyl, pyrazyl, imidazolyl, furyl, thienyl, thiazolyl, isothiazolyl and tetrazolyl, Wherein $R^2$ and $R^3$ are as defined above; or when $m$ is zero $R^4$ is a radical of the formula

wherein $X'$ may be O or S and $R^{10}$ is (lower)alkyl, aryl, (lower)alkenyl, (lower)alkynyl, cycloalkyl, benzyl, phenethyl, (lower)alkoxy, aryloxy, (lower)alkylthio, arylthio, cycloalkyloxy, dialkylamino, cycloalkylamino, or a radical having the formula

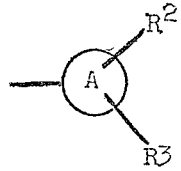

wherein —Ⓐ, $R^2$ and $R^3$ are as defined above.

A more preferred embodiment is a compound having the formula

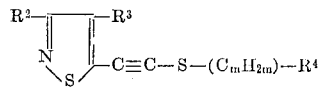

wherein $R^2$ represents hydrogen, (lower)alkyl or carboxy, $R^3$ represents hydrogen, chloro, fluoro, bromo, iodo, (lower)alkyl or carboxy, $m$ and $R^4$ are as described above.

A still more preferred embodiment is a compound having the formula

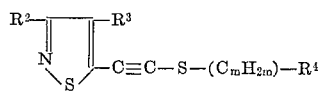

wherein $R^2$ represents hydrogen, (lower)alkyl or carboxy, $R^3$ represents hydrogen, chloro, fluoro, bromo, iodo, (lower)alkyl or carboxy; $R^4$ is hydrogen or phenyl; and when $m$ is an integer of from 1 to 6 inclusive, $R^4$ is a radical having the formula

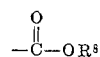

in which $R^8$ is (lower)alkyl or hydrogen.

A most preferred embodiment is a compound having the formula

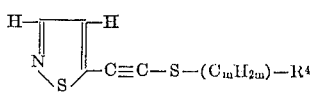

wherein $m$ is a whole integer of 1 to 4 inclusive and $R^4$ is hydrogen. Similarly, most preferred are the compounds when $m$ is 1 or 2 and $R^4$ is carboxy.

Other specifically preferred compounds in this series are the following:

(A)
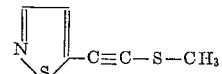

(B)
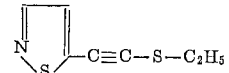

(C)
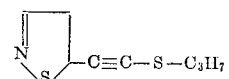

(D)

(E)

(F)

Another preferred embodiment of the present invention is the process for the preparation of compounds having the formula

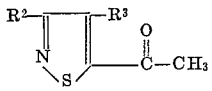

wherein $R^2$ and $R^3$ are alike or different and each represents hydrogen, (lower)alkyl, (lower)alkenyl, (lower)alkoxy, (lower)alkylthio, chloro, fluoro, bromo, iodo, trifluoromethyl, nitro, carboxy or a radical having the formula

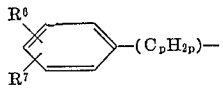

in which $p$ is a whole integer of 0 to 6 inclusive and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy;

Which process comprises mixing, in an inert organic solvent and at a temperature below about −0° C., but preferably below about −50° C., a compound having the formula

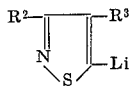

wherein $R^2$ and $R^3$ are as described above, with at least about one equivalent of an acylating agent selected from acetic anhydride and acetyl halides.

A more preferred embodiment is the process as described above wherein $R^2$ represents hydrogen, (lower)alkyl or carboxy, and $R^3$ represents hydrogen, chloro, bromo, fluoro, iodo, (lower)alkyl or carboxy.

A still more preferred embodiment is the above described process wherein $R^2$ and $R^3$ are hydrogen.

The most preferred embodiment is the above described process in which the acylating agent is acetic anhydride.

Another preferred embodiment of the present invention is a compound having the formula

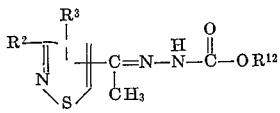

wherein $R^2$ and $R^3$ are alike or different and each represents hydrogen, (lower)alkyl, (lower)alkenyl, (lower)alkoxy, (lower)alkylthio, chloro, bromo, iodo, fluoro, trifluoromethyl, nitro, carboxy, or a radical having the formula

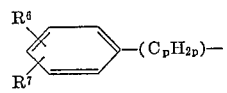

in which $p$ is a whole integer of 0 to 6 inclusive and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro, or carboxy, and $R^{12}$ is (lower)alkyl.

A more preferred embodiment is a compound having the formula

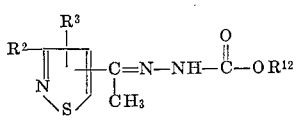

wherein $R^2$ represents hydrogen, (lower)alkyl or carboxy, $R^3$ represents hydrogen, chloro, fluoro, bromo, iodo, (lower)alkyl or carboxy and $R^{12}$ represents (lower)alkyl.

A most preferred embodiment is a compound having the formula

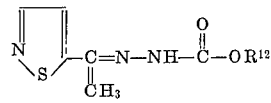

wherein $R^{12}$ is a methyl or ethyl radical.

Another preferred embodiment of the present invention is a compound having the formula

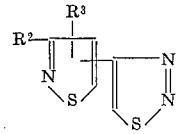

wherein $R^2$ and $R^3$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy, or a radical having the formula

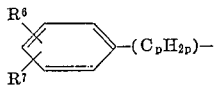

in which $p$ is a whole integer of 0 to 6 inclusive and $R^6$ and $R^7$ are alike or different and each represent hydrogen, (lower)alkyl, (lower)alkenyl, (lower)alkoxy, (lower)alkylthio, chloro, fluoro, bromo, iodo, trifluoromethyl, nitro or carboxy.

A more preferred embodiment is a compound having the formula

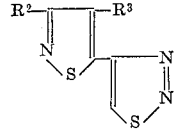

wherein $R^2$ represents hydrogen, (lower)alkyl or carboxy and $R^3$ represents hydrogen, chloro, fluoro, bromo, iodo, (lower)alkyl or carboxy.

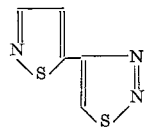

DESCRIPTION OF THE PREFERRED EMBODIMENTS

The following examples will serve to illustrate but not limit the present invention.

EXAMPLE 1

(A) Isothiazole

Sodium acroleinthiosulfate (486 g., 2.56 mole) was added to liquid ammonia (approximately 1 liter). The resulting mixture was stirred for a few hours at −70°, then the ammonia was allowed to evaporate. Enough water was added to the residue to dissolve all the white solid material. The mixture was then extracted with four 150 ml. portions of ether. The combined ether extracts were dried and fractionally distilled to give 133 g. (61%) of isothiazole, B.P. 111–112° (700 mm.).

(B) 5-acetylisothiazole

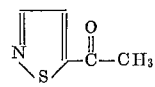

A 1.6 molar solution of n-butyllithium in n-hexane (325 ml., 0.53 mole butyllithium) was dropwise added to a stirred solution of isothiazole (42.5 g., 0.50 mole) in 400 ml. of anhydrous tetrahydrofuran, maintained at approximately −65°. The reaction was carried out in a nitrogen atmosphere. The isothiazolyllithium suspension was slowly siphoned into a vigorously stirred mixture of acetic anhydride (151 g., 1.5 mole) and 200 ml. of anhydrous ether, cooled in a Dry Ice-acetone mixture. The addition was completed in approximately 15 minutes. The reaction mixture was allowed to warm to 0° and then poured into 500 ml. of ice water. The aqueous layer was extracted with two 100 ml. portions of ether. The combined organic layers were dried, followed by removal of the solvent. The residue was fractionally distilled to give 35.4 g. (56%) of 5-acetylisothiazole as a colorless liquid, B.P. 62–63° (1.3 mm.), M.P. 27°.

(C) Carbethoxyhydrazone of 5-acetylisothiazole

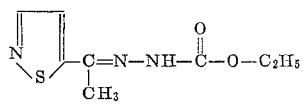

A mixture of 5-acetylisothiazole (82.5 g., 0.65 mole), carbethoxyhydrazine (73 g., 0.70 mole), acetic acid (2 ml.) and methanol (200 ml.) was heated to the boiling point of the methanol and then allowed to cool slowly to room temperature. Ether (400 ml.) was added to the solidified mixture and after cooling in ice, the white solid was filtered off and dried. The product, carbethoxyhydrazone of 5-acetylisothiazole, amounted to 114.5 g. and melted at 149–151°. A recrystallization from ethyl acetate raised the melting point to 151–152°. An additional 5.8 g. of product was obtained when the filtrate was concentrated and the residue recrystallized from ethyl acetate. Total yield: 120.3 g. (87%).

(D) 4-(5'-isothiazolyl)-1,2,3-thiadiazole

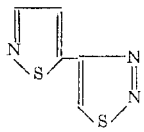

Thionyl chloride (300 ml.) was added to the carbethoxyhydrazone of 5-acetylisothiazole (114.5 g., 0.54 mols) at room temperature. When the red-colored solution was heated slightly a vigorous gas evolution occurred, and the mixture obtained a green color. After the reaction subdued (approximately 20 minutes) the mixture was heated at 50–60° for 2 hours. After cooling, ether (400 ml.) was added to the almost completely solidified reaction mixture and the solid was filtered off. The gray solid was added in portions to a vigorously stirred mixture of 250 g. ice and 250 ml. of water.

The solid was filtered off, washed with water, dried and recrystallized from ethyl acetate, to give 59.2 g. of 4-(5'-isothiazolyl)-1,2,3-thiadiazole as greenish colored crystals, M.P. 117–120°. An additional 5.8 g. of product was obtained when the filtrate consisting of thionyl chloride and ether was concentrated and the residue treated with water, followed by a purification involving elution chromatography on alumina (methylene chloride as solvent) and recrystallization from ethyl acetate. Total yield was 65.0 g. (72%). The melting point could be raised to 119–121° by another recrystallization from ethyl acetate. The n.m.r. spectrum of the compound in dimethylsulfoxide consisted of a singlet at τ 0.17 (thiadiazole proton) and two doublets of the same intensity at τ 1.27 and 185 (respectively $H^3$ and $H^4$ of the isothiazole ring; $J_{3,4}=2$ c.p.s.).

(E) 1-methylthio-2-(5'-isothiazolyl)-ethyne

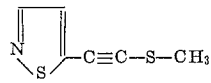

A 1.6 molar solution of n-butyllithium in n-hexane (230 ml., 0.37 mole butyllithium) was added to a stirred suspension of 4-(5'-isothiazolyl)-1,2,3-thiadiazole (59 g., 0.35 mole) in cold anhydrous tetrahydrofuran (350 ml.) at such a rate that the temperature did not exceed −60° C. The addition was carried out in a nitrogen atmosphere. The reaction mixture was stirred an additional 30 minutes after which dimethyl sulfate (44 g., 0.35 mole) was added in one portion. The reaction mixture was allowed to warm to 0°, poured into cold water (300 ml.). The organic layer was separated and the aqueous phase extracted with two 150 ml. portions of ether. The combined organic layers were dried over magnesium sulfate, whereafter the solvent was removed. The darkly colored residue was distilled in vacuo to give 32.7 g. (60%) of 1-methylthio-2-(5'-isothiazolyl)-ethyne as a pale yellow oil, B.P. 93–95° (1 mm.). The infrared spectrum of the neat liquid showed a sharp band at 2160 cm.$^{-1}$ assigned to the acetylenic triple bond. The n.m.r. spectrum (CCl$_4$) contained two doublets at τ 1.65 and 2.81 (respectively $H^3$ and $H^4$ of the isothiazole ring. $J_{3,4}=2$ c.p.s.) and a three-proton singlet at τ 7.50.

(F) 5-isothiazolylacetic acid

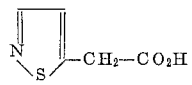

A mixture of 1-methylthio-2-(5'-isothiazolyl)-ethyne (7.1 g., 0.046 mole), methanol (60 ml.) and 3 N aqueous sulfuric acid (30 ml.) was heated under reflux for 5 hours. Most of the methanol was removed under reduced pressure whereafter the residue was extracted with four 50 ml. portions of ether. The combined ether extracts were dried and the solvent removed to give 6.4 g. of brown colored liquid residue (consisting of methyl-5-isothiazolyl acetate and some of the corresponding thioester). The residue was dissolved in 15 ml. of methanol followed by the addition of 17 ml. of 3 N methanolic sodium hydroxide. The mixture, which developed an intense red color, was left at room temperature for 3 hours. The methanol was removed under reduced pressure and the residue dissolved in 40 ml. of water. The aqueous solution was washed once with ether, then layered with 50 ml. of ethyl acetate and acidified with 20 ml. 3 N aqueous sulfuric acid. The aqueous layer was extracted with two additional 25 ml. portions of ethyl acetate. The combined ethyl acetate extracts were dried and treated with decolorizing carbon, then concentrated to a volume of approximately 30 ml. and cooled. The slightly brown colored product, 5-isothiazolylacetic acid, was collected by filtration and weighed 4.0 g. (61%), M.P. 151–153° C. (decomposition).

(G) 2,4-dinitrophenyl 5-isothiazolylacetate

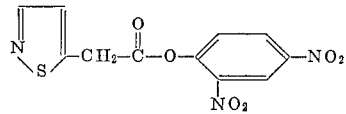

5-isothiazolylacetic acid (0.286 g., 0.002 mole) and 2,4-dinitrophenol (0.368 g., 0.002 mole) were dissolved in dry dioxane (10 ml.) and the solution cooled in an ice-bath. N,N'-dicyclohexylcarbodiimide (0.413 g., 0.002 mole) was added and the solution shaken well and left at room temperature for 2 hours. The precipitated urea was removed by filtration and washed with dry dioxane followed by dry ether. The filtrate and washings were combined and concentrated in vacuo at room temperature. The residue, 2,4-dinitrophenyl-5-isothiazolylacetate, was an orange colored oil and weighed 0.65 g.

(H) Potassium 7-(5-isothiazolylacetamido) cephalosporanate

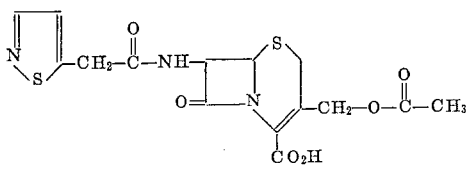

7-aminocephalosporanic acid (0.544 g., 0.002 mole) and triethylamine (0.404 g., 0.004 mole) were shaken with methylene chloride (5 ml.) at room temperature until the mixture was homogeneous. The mixture was cooled in an ice bath and 2,4-dinitrophenyl-5-isothiazolyl-acetate (0.68 g., 0.002 mole) was added with shaking and the resulting solution was left at room temperature for 18 hours for completion of the reaction. The reaction was followed by measuring the intensity of the amide absorption band at 1675 cm.$^{-1}$ in the infrared spectrum. The mixture was filtered and the triethylamine salt precipitated as an oil with ether (30 ml.). The oil was redissolved in methylene chloride (5 ml.) and reprecipitated with ether (30 ml.). The solvent was decanted and the oil dissolved in methanol (4 ml.) followed by addition of potassium 2-ethylhexanoate in n-butanol (2.5 M., 10 ml.). Addition of ether (30 ml.) precipitated potassium 7-(5-isothiazolylacetamide)-cephalosporanate. The precipitate was filtered, dissolved in methanol (10 ml.), reprecipitated with ether (50 ml.), filtered and dried in vacuo for 3 hours. Potassium 7-(5-isothiazolylacetamido)cephalosporanate was obtained a a yellow colored solid and weighed 0.63 g.

The product, potassium 7-(5-isothiazolylacetamido)-cephalosporanate, was found to contain the β-lactam structure as shown by infrared analysis and to inhibit *Staph. aureus* Smith at 0.125 to 0.25 mcg./ml., to inhibit *Staph. aureus* BX-1633-2 at 0.8 to 1.6 mcg./ml., to inhibit *Salmonella enteritidis* at 1.6 mcg./ml., and to exhibit versus *Staph. aureus* Smith in mice a $CD_{50}$ of 1.8 mgm./kg. upon intramuscular injection and a $CD_{50}$ of 4.5 mgm./kg. upon oral administration and versus *Salmonella enteritidis* in mice a $CD_{50}$ of 140 mgm./kg. upon intromuscular injection.

EXAMPLE 2

General procedure for the preparation of carbalkoxyhydrazones (III) from ketones (II)

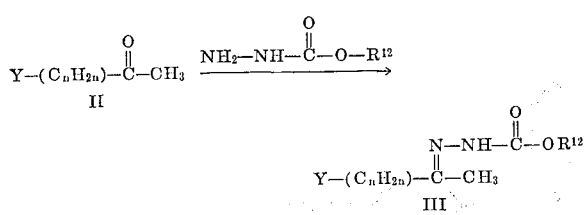

A quantity of a ketone having the Formula II is mixed together with an approximately equimolar quantity (plus 5 to 10% excess) of a carbalkoxyhydrazine, preferably carbethoxyhydrazine or carbmethoxyhydrazine, in a polar solvent such as methanol, ethanol, propanol, and the like, but preferably methanol, along with a catalytic amount of acetic acid. The resultant mixture is heated up to the boiling point for a period of time of 5 to 30 minutes and then allowed to cool to room temperature. The desired carbalkoxyhydrazone (III) usually solidifies and can be collected by filtration. The product can be purified by recrystallization to produce analytically pure product (III).

EXAMPLE 3

Procedure for the preparation of 4-substituted-1,2,3-thiadiazoles (IV) from compounds of Formula III

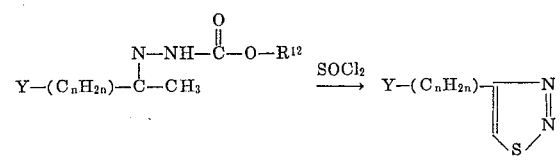

The carbalkoxyhydrazone (III) is dissolved in about a 5 to 50 molar excess, but preferably about a 10 molar excess, of a thionyl halide, preferably thionyl chloride at about room temperature. The resultant yellow to red-colored solution is heated slightly and a vigorous reaction usually ensues with the evolution of gas. The solution usually turns green.

When the reaction subsides after about 20 to 40 minutes, the reaction mixture is heated at about 40° C. to 70° C. for about 2 hours.

After cooling, the excess of thionyl chloride is removed by distillation. The crude product can be purified by standard methods such as, washing with an aqueous sodium bicarbonate solution, elution chromatography over alumina or silica gel distillation or by recrystallization from a solvent such as ethyl acetate, hexane, benzene, tetrahydrofuran, dioxane, mixtures of same or the like to yield analytically pure product IV.

However, when the structure of the starting material III is such that the 1,2,3-thiadiazole can cyclize 2 ways, a mixture of compounds may result. The two compounds are designated as IVa and IVb.

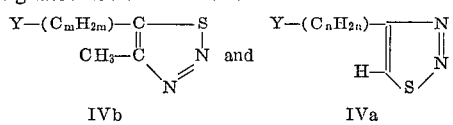

Resolution of the two components to isolate compound IVa can usually be accomplished by such methods as chromatography, crystallization, reduced pressure distillation, liquid-liquid partition, or the like.

EXAMPLE 4

General procedure for the preparation of 1-alkynyl thioethers (VI) via compounds IVa and V

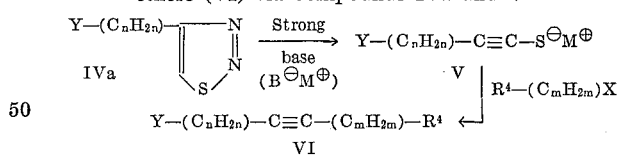

A solution containing an equimolar (plus 20% excess) of a strong base such as butyllithium, methyllithium, phenyllithium, sodamide, potassium t-butoxide, sodium methylsulfinylcarbanion is added to a stirred suspension of a 4-substituted-1,2,3-thiadiazole in cold anhydrous tetrahydrofuran at such a rate so that the temperature is kept below 0° C., and preferably below —60° C. When the base is potassium t-butoxide or sodium methyl sulfinylcarbanion, the temperature can be closer to 0 to —20° C. The other bases are most efficient at temperatures close to —60° C.

The addition of the base is carried out in a nitrogen atmosphere. The solution usually becomes colored and quite often a colored solid precipitates from the solution. The reaction mixture is usually stirred an additional 10 to 30 minutes after which time at least one equivalent of an alkali metal-displacing alkylating agent selected from the groups disclosed previously is added in one portion. The reaction mixture is allowed to warm to 0° C., and is poured into cold water. The product is collected by multiple extraction with a water immiscible organic solvent. The combined organic extracts are dried over magnesium sulfate, filtered and the solvent removed in vacuo.

The residue is purified by distillation under reduced pressure or by crystallization to produce an analytically pure alkynyl thioether of Formula VI.

EXAMPLE 5

General procedure for the preparation of acids (IX) from alkynyl thioethers (VI).

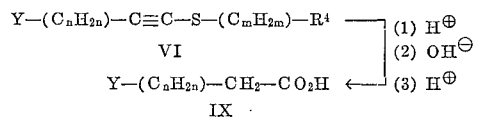

A mixture of an alkynyl thioether of Formula VI, about 50% aqueous sulfuric acid and acetic acid is heated under reflux for 2 hours and then added to ice-water. The mixture was extracted with several portions of ethyl acetate. The combined ethyl acetate extracts are dried over a drying agent, filtered and concentrated under reduced pressure to yield a solid or semi-solid product determined to be the acid (IX) corresponding to the starting alkynyl thioether (VI).

Alternatively, the alkynyl thioether VI is dissolved in methanol and 3 N aqueous sulfuric acid and heated under reflux for about 4 to 6 hours. The methanol is removed in vacuo and the residue then extracted with several portions of ether, ethyl acetate or the like. The solvent is removed in vacuo. Analytical determination usually indicates the residue is a mixture of the corresponding methyl ester and thioester.

The residue is dissolved in 1 to 2 N methanolic sodium hydroxide and allowed to stand at room temperature for at least 3 hours. The methanol is removed in vacuo and the residue dissolved in water. The aqueous solution is extracted with ether, layered with ethyl acetate, and acidified with 3 N sulfuric acid. The ethyl acetate layer is collected. Several ethyl acetate extractions are performed on the aqueous phase. The combined ethyl acetate extracts are dried and decolorized with activated charcoal. The ethyl acetate solution was concentrated and the desired acid IX is collected by filtration to yield analytically pure IX.

EXAMPLE 6

(A) Carbethoxyhydrazinoacetophenone

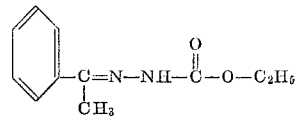

A mixture of acetophenone (60 g., 0.50 mole), methanol (120 ml.), glacial acetic acid (3 ml.) and carbethoxyhydrazine (60 g., 0.577 mole) was left at room temperature for 16 hours. The mixture was diluted with water (100 ml.), cooled and filtered. The solid hydrazone was recrystallized from aqueous methanol to give 98 g. (95%) of white needles, M.P. 117–119° C.

(B) 4-phenyl-1,2,3-thiadiazole

Carbethoxyhydrazinoacetophenone (98 g., 0.47 mole) was slowly added with vigorous stirring to thionyl chloride (100 ml.), cooled in an ice bath, so that the temperature did not exceed 10° C. After the complete addition the reaction mixture was allowed to warm to room temperature when it became a dark red color with the copious evolution of gas. The mixture was heated with stirring at 60° C. for 1 hour whereafter the excess of thionyl chloride was removed. The residue was recrystallized from hexane using a little decolorizing charcoal. There was obtained 61 g. (80%) of pale yellow crystals, M.P. 77–79° C. Reported M.P. 77–78° C. (11).

(C) 1-methylthio-2-phenylethyne

Substitution in the procedure E of Example 1 or the general procedure of Example 2 of 4-phenyl-1,2,3-thiadizole for the 4-(5'-isothiazolyl)-1,2,3-thiadiazole used therein produces 1-methylthio-2-phenylethyne.

(D) phenylacetic acid

Substitution in the general procedure of Example 3 of 1-methylthio-2-(5'-isothiazolyl)-ethyne for the alkynyl thioether used therein produces phenylacetic acid.

EXAMPLE 7

(A) Carbethoxyhydrazone of 2-acetylthiophene

A mixture of 2-acetylthiophene (25.2 g., 0.2 mole) (16), methanol (50 ml.), carbethoxyhydrazine (20.8 g., 0.2 mole) and glacial acetic acid (0.5 ml.) was left at room temperature for 16 hours. The mixture was diluted with water (100 ml.), cooled and filtered. The solid was recrystallized from benzene-hexane to give 36 g. (85%) of fluffy white needles, M.P. 121–122° C.

*Analysis.*—Calc'd for $C_9H_{12}N_2O_2S$: C, 50.92; H, 5.70; N, 13.20; S, 15.10. Found: C, 51.10; H, 5.83; N, 13.45; S, 14.95.

(B) 4-(2'-thienyl)-1,2,3-thiadiazole

Carbethoxyhydrazinomethyl-2-thienylketone (25 g., 0.118 mole) was added to ice-cold thionyl chloride (60 ml.). When the mixture was warmed a vigorous gas evolution started. The reaction mixture was left at 55–60° C. for one hour. The excess of thionyl chloride was removed and benzene (100 ml.) was added to the red-colored residue. The filtrate was run through an aluminia column and eluted with an additional amount of benzene (250 ml.). The yellow eluant was concentrated to a volume of approximately 40 ml., followed by the addition of n-hexane (50 ml.). The precipitated oil solidified on cooling with scratching. An additional amount of hexane (100 ml.) was added and the mixture cooled and filtered. There was thus obtained 17 g. (86%) of a yellow solid, M.P. 68–70° C., rapidly turning pink on exposure to light. A sample recrystallized from benzene-hexane melted at 70–71° C. The nuclear magnetic resonance spectrum (CDCl₃) ocntained a sharp one proton singlet at $\tau$ 1.42 ascribed to the thiadiazole 5-proton, and a complex three proton pattern centered at 2.6 ascribed to the thiophene protons.

*Analysis.*—Calc'd. for $C_6H_4N_2S_2$: C, 42.84; H, 2.40; N, 16.66; S, 38.12. Found: C, 43.13; H, 2.59; N, 16.61; S, 37.90.

(C) 1-ethylthio-2-(2'-thienyl)-ethyne 1-ethylthio-2-(2'-thienyl)ethyne, B.P. 72–74° (0.1 mm.), $\lambda_D^{26}$ 1.6402, was prepared in 86% yield from 4-(2'-thienyl)-1,2,3-thiadiazole and ethyl iodide as per Example 2. The infrared spectrum of the neat liquid showed a band of medium intensity at ca. 2140 cm.⁻¹ ascribed to the acetylenic bond. The nuclear magnetic resonance spectrum (CCl₄) showed a complex absorption pattern for the thiophene protons centered at $\tau$ 2.9, a methylene quartet at $\tau$ 7.24 and a methyl triplet at $\tau$ 8.58 with an integrated area ratio of 3:2:3 respectively.

*Analysis.*—Calc'd for $C_8H_8S_2$: C, 57.10; H, 4.79; S, 38.11. Found: C, 56.77; H, 4.47; S, 37.70.

(D) 2-thienylacetic acid

Substitution in the general procedure of Example 3 of 1-ethylthio-2-(2'-thienyl)-ethyne produces 2-thienylacetic acid.

EXAMPLE 8

The preparation of carbethoxyhydrazones

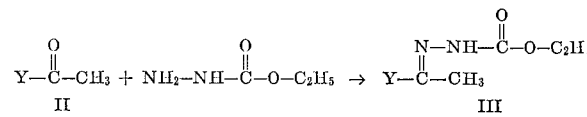

Substitution in the procedure of Example 2 for the preparation of carbalkoxyhydrazones (III) from their corresponding ketones (II) produced the following products:

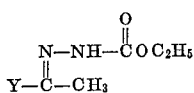

| No. | Y | M.P., °C. | Yield, percent |
|---|---|---|---|
| 1 | phenyl | 117–119 | 95 |
| 2 | CH₃O-phenyl | 131–132 | 88 |
| 3 | Cl-phenyl | 138–141 | 90 |
| 4 | 2,4-Cl₂-phenyl | ¹ 146–148 / ¹ 101–105 | 58 / 24 |
| 5 | thienyl | 121–122 | 85 |
| 6 | thiazolyl | 151–152 | 87 |
| 7 | O₂N-furyl | 192–194 | 85 |

| No. | Y | M.P., °C. | Yield, percent |
|---|---|---|---|
| 8 | pyridyl | 116–118 | 88 |
| 9 | (C₂H₅OCNH-N=C(CH₃)- p-phenyl) | 236–238 (dec.) | 95 |

¹ Two different isomers were isolated. Both products were converted to 4-p-methoxyphenyl-1,2,3-thiadiazole upon treatment with thionyl chloride.

EXAMPLE 9

Preparation of 4-substituted-1,2,3-thiadiazoles

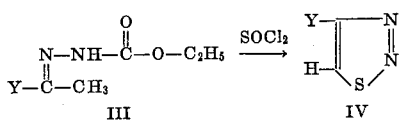

Substitution in the procedure of Example 3 for the preparation of 1,2,3-thiadiazoles (IV) from the corresponding carbethoxyhydrazone (III) produced the following products:

| No. | Y | M.P., °C. | Recrystall. | Yield, percent | Calcd. C | Calcd. H | Calcd. N | Calcd. S | Found C | Found H | Found N | Found S |
|---|---|---|---|---|---|---|---|---|---|---|---|---|
| 1 | phenyl | 77–79 | n-Hexane | 80 | | | | | | | | |
| 2 | CH₃O-phenyl | 92–94 | Benzene-n-hexane | 74 | 56.22 | 4.20 | 14.57 | | 55.99 | 4.44 | 14.60 | |
| 3 | Cl-phenyl | 137–139 | Benzene | 79 | 48.85 | 2.56 | 14.25 | | 48.96 | 2.58 | 14.89 | |
| 4 | 2,4-Cl₂-phenyl | 109–112 | Benzene-n-hexane | 78 | 41.57 | 1.74 | | | 41.56 | 1.96 | | |
| 5 | thienyl | 70–71 | do | 86 | 42.84 | 2.40 | 16.66 | 38.12 | 43.13 | 2.59 | 16.61 | 37.90 |
| 6 | thiazolyl | 119–121 | Ethyl acetate | 72 | 35.49 | 1.79 | 24.83 | | 35.64 | 2.14 | 24.50 | |
| 7 | O₂N-furyl | 176–177 | Tetrahydrofuran | 83 | 36.54 | 1.53 | 21.31 | | 36.49 | 1.24 | 20.95 | |
| 8 | pyridyl | ¹ 90–92 | Benzene-n-hexane | 86 | 51.51 | 3.09 | 25.74 | | 51.17 | 3.24 | 25.85 | |
| 9 | (thiadiazolyl-phenyl) | 255 (dec.) | Dioxane | 97 | 48.75 | 2.46 | 22.75 | | 49.02 | 2.22 | 23.03 | |

¹ HCl salt: M.P., 230–235° (dec.).

Table for Example 10

| No. | Y | R⁴ | X | Base | Yield, percent | B.P., °C. (mm. Hg) or M.P., °C. | Analyses, percent Calculated/Found C | H | Cl | N | S |
|---|---|---|---|---|---|---|---|---|---|---|---|
| 1 | H | CH₂—C₆H₅ | Cl | n-BuLi | 64 | 73–75 (1.0) | | | | | |
| 2 | CH₃ | n-C₄H₉ | Br | n-BuLi | 60 | 74 (16) | | | | | |
| 3 | CO₂H | C₂H₅ | I | n-BuLi | 86 | | | | | | |
| 4 | CH₃OC(O)— | CH₃ | O—SO₃CH₃ | Na⊕ ⊖CH₂SCH₃ (O) | 89 | 55–55.5 (1.5) | 46.14 / 46.07 | 4.65 / 4.91 | | | 24.64 / 24.50 |
| 5 | H₂NC(O)— | CH₃ | I | C₆H₅Li | 70 | 113–125 | | | | | |
| 6 | ⌬ | CH₃ | I, OSO₃CH₃ | n-BuLi | 91 | 91–93 (1.0) | 73.03 / 73.03 | 5.45 / 5.07 | | | 21.00 / 21.45 |
| 7 | ⌬ | C₂H₅ | I | n-BuLi | 91 | 69–70 (0.3) | | 5.45 / 5.45 | | | |
| 8 | ⌬ | CH₂—COC₂H₅ (O) | Br | n-BuLi | 80 | 132–133 (0.3) | 65.45 / 65.86 | 4.20 / 4.57 | | | 14.54 / 14.25 |
| 9 | ⌬ | CH₂—COH (O) | | n-BuLi | 90 | 68–70 (carbon tetrachloride) | 62.48 / 62.47 | | | | 16.68 / 17.20 |
| 10 | ⌬ | C(O)—OCH₃ | Cl | n-BuLi | 88 | 97–98 (0.1) | 62.48 / 62.70 | 4.20 / 4.41 | | | 16.68 / 17.05 |
| 11 | ⌬ | C(O)OC₂H₅ | Cl | n-BuLi | 89 | 102–104 (0.2) | 64.03 / 64.16 | 4.89 / 5.02 | | | 15.54 / 15.49 |
| 12 | ⌬ | C(O)—O—n-C₃H₇ | Cl | n-BuLi | 83 | 115–116 (0.3) | 65.42 / 65.65 | 5.49 / 5.89 | | | 14.55 / 14.51 |
| 13 | ⌬ | C(O)—O—iso-C₄H₉ | Cl | n-BuLi | 89 | 114–115 (0.1) | 66.64 / 66.82 | 6.02 / 6.08 | | | |
| 14 | ⌬ | C(O)OC₂H₅ | Cl | n-BuLi | 81 | 121–122 (0.2) | | | | | |
| 15 | ⌬ | C(O)—SCH₃ | Cl | n-BuLi | 58 | 93–94 (0.5) | 68.14 / 68.20 | 4.58 / 4.66 | | | 18.19 / 17.89 |
| 16 | ⌬ | C(O)—N(CH₃)₂ | Cl | n-BuLi | 76 | 64–66 (benzene-n-hexane) | 64.35 / 64.02 | 5.40 / 5.27 | | 6.82 / 6.60 | 15.62 / 15.22 |

Table for Example 10—Continued

| No. | Y | R⁴ | X | Base | Yield, percent | B.P., °C. (mm. Hg) or M.P., °C. | C | H | Cl | N | S |
|---|---|---|---|---|---|---|---|---|---|---|---|
| 17 | C₆H₅ | —C(=O)—C₆H₅ | Cl | n-BuLi | 85 | 56-57 (n-hexane) | 75.60 / 75.42 | 4.23 / 4.68 | --- | --- | 13.46 / 13.55 |
| 18 | C₆H₅ | —C(=O)—C₆H₄—Cl | Cl | n-BuLi | 83 | 61-62 (n-hexane) | 66.06 / 65.83 | 3.33 / 3.55 | 13.00 / 12.98 | --- | 11.76 / 12.11 |
| 19 | CH₃O—C₆H₄— | —COOC₂H₅ | Cl | n-BuLi | 76 | 49-51 (n-hexane) | 60.98 / 61.21 | 5.12 / 5.38 | --- | --- | 13.57 / 13.81 |
| 20 | Cl—C₆H₄— | CH₃ | OSO₃CH₃ | n-BuLi | 73 | 88-90 (0.4) | 59.17 / 58.94 | 3.86 / 3.83 | 19.41 / 19.25 | --- | 17.55 / 17.47 |
| 21 | Cl—C₆H₄— | —COOC₂H₅ | Cl | n-BuLi | 80 | 121-122 (0.1) / 30-31 | 54.88 / 55.02 | 3.77 / 3.89 | --- | --- | 13.32 / 13.40 |
| 22 | Cl₂—C₆H₃— | —COOC₂H₅ | Cl | C₆H₅Li | 61 | 65-67 (n-hexane) | 48.01 / 48.21 | 2.93 / 3.15 | 25.77 / 25.69 | --- | 11.65 / 11.91 |
| 23 | thienyl | C₂H₅ | I | n-BuLi | 86 | 72-74 (0.1) | 57.10 / 56.77 | 4.79 / 4.47 | --- | --- | 38.11 / 37.70 |
| 24 | thienyl | —COOC₂H₅ | Cl | n-BuLi | 80 | 114-115 (0.5) | 50.92 / 51.19 | 3.80 / 3.69 | --- | --- | 30.21 / 29.81 |
| 25 | thiazolyl | CH₃ | I, OSO₃CH₃ | Na⊕ ⊖CH₂S(=O)CH₃ | 90 | 68-70 (0.2) | 46.43 / 46.52 | 3.25 / 3.38 | --- | --- | 41.32 / 41.00 |
| 26 | pyridyl | CH₃ | OSO₃CH₃ | C₆H₅Li | 65 | 72-73 (0.2) | 64.37 / 64.69 | 4.73 / 4.90 | --- | 9.39 / 9.24 | 21.49 / 21.50 |
| 27 | CH₃S—C≡C— | —C≡C—SCH₃ | OSO₃CH₃ | n-BuLi | 63 | 80-82 (n-hexane) | 66.01 / 66.03 | 4.62 / 4.39 | --- | --- | 29.38 / 29.65 |
| 28 | C₂H₅O—C(=O)—SC≡C— | —C≡C—SCOC₂H₅ (=O) | Cl | n-BuLi | 45 | 92-94 (benzene-n-hexane) | 57.47 / 57.75 | 4.22 / 4.02 | --- | --- | 19.18 / 19.30 |

EXAMPLE 10

Preparation of 1-alkynyl thioethers from 4-substituted 1,2,3-thiadiazoles

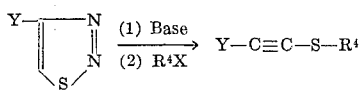

Substitution in the procedure of Example 4 for the preparation of 1-alkynyl thioethers (VI) from their corresponding 4-substituted 1,2,3-thiadiazoles (IVa) produced the following compounds:

EXAMPLE 11

The effect of various bases on the yield of 1-methylthio-2-phenylethyne and 1-methylthio-2-(5'-isothiazolyl)-ethyne from their corresponding 1,2,3-thiadiazoles via Example 4.

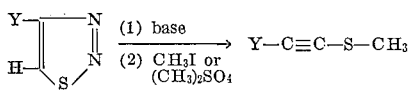

Substitution in the procedure of Example 4 using various bases, solvents and temperatures produced the following results:

| | | Percent yield | |
|---|---|---|---|
| Base | Temp., °C. | Y=⟨phenyl⟩ | Y=⟨isothiazolyl⟩ |
| n-$C_4H_9Li$ [a] | −65 | 91 | 60 |
| $CH_3Li$ [a] | −65 | 91 | 90 |
| $C_6H_5Li$ [a] | −65 | 84 | 89 |
| $NaNH_2$ [b] | −60 | 83 | 68 |
| $Na\overset{\oplus}{C}H_2\overset{\ominus}{S}\overset{\uparrow O}{C}H_3$ [c] | −20 | 88 | 90 |
| $\overset{\oplus}{K}\overset{\ominus}{O}$-tert-$C_4H_9$ [d] | 0 | 68 | 77 |

[a] Solvent: tetrahydrofuran.
[b] Solvent: ammonia.
[c] Solvent: dimethylsulfoxide-tetrahydrofuran.
[d] Solvent: tert-butyl alcohol-tetrahydrofuran.

1-methylthio-2-phenylethyne (1) With n-butyllithium.—Substitution in the procedure E of Example 1 or the general procedure of Example 2 of 4-phenyl-1,2,3-thiadiazole for the 4-(5'-isothiazolyl)-1,2,3-thiadiazole used therein produces 1-methylthio-2-phenylethyne.

(2) With methyllithium.—A 1.66 molar solution of methyllithium in diethyl ether (36 ml., 0.060 mole of methyllithium) was added to a stirred solution of 4-phenyl-1,2,3-thiadiazole (8.1 g., 0.050 mole) in 75 ml. of anhydrous tetrahydrofuran, cooled in Dry Ice-acetone, at such a rate that the temperature did not exceed −60°. The addition was carried out in a nitrogen atmosphere. When the addition was completed, the reaction mixture was stirred an additional 10 minutes, after which dimethyl sulfate (7.5 g., 0.060 mole) was added in one portion. The reaction mixture was allowed to warm to 0° and poured into 75 ml. of cold water. The product was extracted with three 50 ml. portions of ether. The combined ether extracts were dried over magnesium sulfate, whereafter the solvent was removed. The residue was distilled in vacuo to give 6.7 g. (91%) of colorless liquid, B.P. 67–69° (0.3 mm.).

(3) With phenyllithium.—The reaction was carried out in the same manner and on the same scale as under (2) except that a 2.1 molar solution of phenyllithium in benzene-diethyl ether (3:1) (28 ml., 0.050 mole of phenyllithium) was used. After distillation there was obtained 6.2 g. (84%) of colorless product, B.P. 67–69° (0.3 mm.).

(4) With sodamide.—4-phenyl-1,2,3-thiadiazole (6.5 g., 0.040 mole) was added in portions to a stirred suspension of sodamide (prepared from 0.060 g. at. of sodium) in 100 ml. of ammonia at −60°. The reaction mixture was stirred at −60° for an additional one hour, whereafter methyl iodide (11.4 g., 0.080 mole) was added in one portion. The temperature of the reaction mixture was allowed to rise and the ammonia was evaporated. To the residue was added 100 ml. of water and the product was extracted with four 50 ml. portions of ether. The combined ether extracts were dried and the ether removed. The residue was distilled in vacuo to give 4.9 g. (83%) of colorless product, B.P. 74–76° (0.3 mm.), identical with the material obtained under (1)–(3).

(5) With sodium methylsulfinyl carbanion.—Anhydrous tetrahydrofuran (50 ml.) was added to a solution of sodium methylsulfinyl carbanion (prepared from 0.065 mole of sodium hydride) in 30 ml. of dimethylsulfoxide, and the thus obtained mixture was cooled to −20°. A solution of 4-phenyl-1,2,3-thiadiazole (8.1 g., 0.050 mole) in 50 ml. of anhydrous tetrahydrofuran was added under stirring, while the temperature of the reaction mixture was maintained at approximately −20°. The reaction mixture was stirred for an additional 20 minutes, whereafter dimethyl sulfate (8.8 g., 0.070 mole) was added in one portion. Most of the tetrahydrofuran was removed and the residue added to 100 ml. of water. The product was extracted with three 50 ml. portions of ether. The combined ether extracts were dried and the solvent removed. A vacuum distillation of the residue yielded 6.5 g. (88%) of colorless product, B.P. 63–64° (0.1 mm.).

(6) With potassium tert-butoxide.—A solution of 4-phenyl-1,2,3-thiadiazole (8.1 g., 0.050 mole) in 40 ml. of anhydrous tetrahydrofuran was added in 20 minutes to a stirred mixture of potassium tert-butoxine (prepared from 0.054 g. at. of potassium), tert-butyl alcohol (40 ml.) and tetrahydrofuran (20 ml.), at 0°. The reaction was carried out in a nitrogen atmosphere. After the addition was completed the mixture was stirred at 0° for an additional 30 minutes, whereafter dimethyl sulfate (7.6 g., 0.060 mole) was added in one portion. The reaction mixture was added to 200 ml. of ice-water. The product was extracted with four 50 ml. portions of ether. The combined ether extracts were dried over magnesium sulfate, whereafter the ether was removed. To the residue was added some n-hexane. A yellow solid (0.70 g., 9%) M.P. 192–196°, was filtered off, the melting point of which was not depressed by the addition of some authentic 2,ω-diphenyl-1,4-dithiafulvene; the infrared spectra were also superimposable. The n-hexane was removed from the filtrate and the residue distilled in vacuo to give 5.0 g. (68%) of colorless product. B.P. 85–86° (1.5 mm.).

1-methylthio-2-(5'-isothiazolyl)ethyne (7) With n-butyllithium.—A 1.6 molar solution of n-butyllithium in n-hexane (230 ml., 0.37 mole butyllithium) was added to a stirred suspension of 4(5'-isothiazolyl)-1,2,3-thiadiazole (59 g., 0.35 mole) in anhydrous tetrahydrofuran (350 ml.), cooled in Dry Ice-acetone, at such a rate that the temperature did not exceed −60° C. The addition was carried out in a nitrogen atmosphere. The reaction mixture was stirred an additional 30 minutes, after which dimethyl sulfate (44 g., 0.35 mole) was added in one portion. The reaction mixture was allowed to warm to 0° and was then poured into cold water (300 ml.). The organic layer was separated and the aqueous phase extracted with two 150 ml. portions of ether. The combined organic layers were dried over magnesium sulfate, whereafter the solvent was removed. The darkly colored residue was distilled in vacuo to give 32.7 g. (60%) of 1-methylthio-2-(5'-isothiazolyl) ethyne as a pale yellow oil, B.P. 93–95° (1 mm.). The infrared spectrum of the neat liquid showed a sharp band at 2160 cm. assigned to the acetylenic triple bond. The n.m.r. spectrum (CCl$_4$) contained two doublets at $\tau$ 1.65 and 2.81 (respectively H$^3$ and H$^4$ of the isothiazole ring. J$_{3,4=2}$ c.p.s.) and a three-proton singlet at $\tau$ 7.50.

(8) With methyllithium.—A 1.66 molar solution of methyllithium in diethyl ether (210 ml., 0.35 mole of methyllithium) was added to a stirred suspension of 4-(5'-isothiazolyl)-1,2,3-thiadiazole (56.0 g., 0.33 mole) in 400 ml. of anhydrous tetrahydrofuran, cooled in Dry Ice-acetone, at such a rate that the temperature did not exceed −60° C. The addition was carried out in a nitrogen atmosphere. After the addition was completed the reaction mixture was stirred an additional 30 minutes, after which dimethyl sulfate (42.0 g., 0.33 mole) was added in one portion. The reaction mixture was worked-up as described under 1. After distillation there was obtained 46.7 g. (90%) of 1-methylthio-2-(5'-isothiazolyl)ethyne as a pale yellow liquid, B.P. 68–70° (0.2 mm.), identical with the material obtained under 1.

(9) With phenyllithium.—A 2.1 molar solution of phenyllithium in benzenediethyl ether (3.1)(26.5 ml., 0.056 mole of phenyllithium) was added to a stirred suspension of 4-(5'-isothiazolyl)-1,2,3-thiadiazole (8.5 g., 0.050 mole) in 75 ml. of anhydrous tetrahydrofuran, cooled in dry ice-acetone, at such a rate that the temperature did not exceed −60°. The addition was carried out in a nitrogen atmosphere. After the addition was completed the mixture was stirred for an additional 30 minutes whereafter methyl iodide (11.0 g., 0.077 mole) was added in one portion. The reaction mixture was worked-up as under 1, and after distillation there was obtained 6.9 g. (89%) of 1 - methylthio - 2 - (5' - isothiazolyl)-ethyne.

(10) With sodamide.—A solution of 4-(5'-isothiazolyl)-1,2,3-thiadiazole (8.5 g., 0.050 mole) in 100 ml. of anhydrous tetrahydrofuran was added in 15 minutes to a stirred suspension of sodamide (prepared from 0.060 g. atoms of sodium) in approximately 100 ml. of liquid ammonia. During the addition, the temperature of the reaction mixture was maintained at −60°. When the addition was completed the reaction mixture was kept at −60° for an additional two hours, whereafter methyl iodide (14.2 g., 0.10 mole) was added in one portion. The temperature of the reaction mixture was allowed to rise and the ammonia and tetrahydrofuran were removed. To the residue was added 100 ml. of water and the organic material was extracted with four 50 ml. portions of ether. The combined ether extracts were dried, the solvent removed and the residue distilled in vacuo to give 5.3 g. (68%) of the desired product.

(11) With sodium methylsulfinyl carbanion.—A solution of sodium methylsulfinyl carbanion was prepared from 14.4 g. (0.60 mole) of sodium hydride and 200 ml. of dimethylsulfoxide according to the procedure described by E. J. Corey and M. Chaykovsky (J. Am. Chem. Soc. 87, 1345 (1965)). To this solution was added 275 ml. of anhydrous tetrahydrofuran, whereafter the mixture was cooled to −20° C. A solution of 4-(5'-isothiazolyl)-1,2,3-thiadiazole (84.5 g., 0.50 mole) in a mixture of 100 ml. of dimethylsulfoxide and 120 ml. of anhydrous tetrahydrofuran was added in 20 minutes, with stirring, while the temperature of the reaction mixture was maintained at −20° ±5° C. The reaction mixture was stirred for an additional 30 minutes, whereafter dimethyl sulfate (82 g., 0.65 mole) was added over a period of 5 minutes. The temperature was kept below 0° C. during the addition. The mixture was then allowed to come to room temperature, whereafter most of the tetrahydrofuran was removed. The residue was added to approximately 1 liter of water and the aqueous mixture was extracted with three 250 ml. portions of ether. The combined ether extracts were dried, the ether removed and the residue distilled in vacuo to give 70 g. (90%) of 1-methylthio-2-(5'-isothiazolyl)ethyne, B.P. 67–68° (0.2 mm.).

(12) With potassium tert-butoxide.—A solution of 4-(5-isothiazolyl)-1,2,3-thiadiazole (8.5 g., 0.050 mole) in 75 ml. of anhydrous tetrahydrofuran was added dropwise in 15 minutes to a stirred mixture of potassium tert-butoxide (prepared from 0.054 g. at. potassium), tert-butyl alcohol (40 ml.) and anhydrous tetrahydrofuran (20 ml.) at 0°. The reaction mixture was stirred for an additional 15 minutes, whereafter dimethyl sulfate (7.6 g., 0.060 mole) was added in one portion. The mixture was next added to 200 ml. of ice-water and extracted with three 50 ml. portions of ether. The combined ether extracts were dried with magnesium sulfate.

EXAMPLE 12

Preparation of 1-substitutedthio-2-(3'-substituted-5'-isothiazolyl) - ethynes and 1 - substitutedthio - 2 - (3'-substituted-5'-isothiazolyl-alkyl)-ethynes Successive substitution of the product obtained in the procedures of Examples 2, 3, and 4 when a 3 or 4-substituted-5-isothiazolylketone is used as starting material produces compounds characterized by the following formula

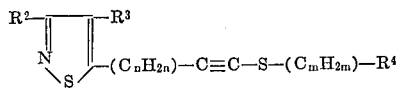

Substitution for the ketone II of 1-(3'-phenyl-5'-isothiazolyl)-1-ethanone,
1-(3'-phenyl-5'-isothiazolyl)-2-propanone,
1-(3'-methoxy-5'-isothiazolyl)-3-butanone,
1-(4'-bromo-5'-isothiazolyl)-1-ethanone,
1-(3'-carboxy-5'-isothiazoyly)-1-ethanone,
1-(3-ethyl-5'-isothiazolyl)-5-hexanone,
1-(4-fluoro-5'-isothiazolyl)-1-ethanone,
1-(3'-phenyl-4'-methyl-5'-isothiazolyl)-1-ethanone, or
1-(3',4'-dimethyl-5'-isothiazolyl)-1-ethanone produces respectively, when in Example 4 the corresponding alkali metal alkynyl mercaptide is reacted with methyl iodide or dimethylsulfate, 1-methylthio-2-(3'-phenyl-5'-isothiazolyl)ethyne,
1-methylthio-3-(3'-phenyl-5'-isothiazolyl)-1-propyne,
1-methylthio-4-(3'-methoxy-5'-isothiazolyl)-1-butyne,
1methylthio-2-(4'-bromo-5'-isothiazolyl)ethyne,
1-methylthio-2-(3'-carboxy-5'-isothiazolyl)ethyne,
1-methylthio-6-(3'-ethyl-5'-isothiazolyl)-1-hexyne,
1-methylthio-2-(4'-bromo-5'-isothiazolyl)ethyne,
1-methylthio-2-(3'-phenyl-4'-methyl-5'-isothiazolyl)-ethyne and
1-methylthio-2-(3',4'-dimethyl-5'-isothiazolyl)ethyne.

When the above described alkali metal alkynyl mercaptides, prepared from the ketones named above, are reacted with a variety of alkali metal-displacing alkylating agents such as bromoacetic acid, α-chloroethylacetate, acetyl chloride, acetic anhydride, 1-bromo-3-butene, α-bromoacetonitrile, etc., the process produces the corresponding S-substituted-thio derivatives.

EXAMPLE 13

Preparation of 4-isothazolylacetic acid

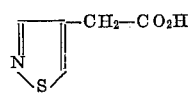

Substitution in the procedure of Example 1, steps C through F, for the 5-acetylisothiazole used therein of 4-acetylisothiazole produces 4-isothiazolylacetic acid.

EXAMPLE 14

Preparation of phenylpropanoic acid

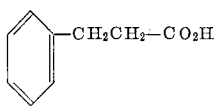

Successive substitution in the procedures of Examples 2, 3, 4 and 5 for the ketone II used therein in Example 2 of 1-phenyl-2-propanone produces phenylpropanoic acid.

We claim:

1. A compound having the formula

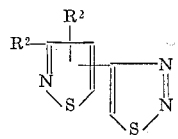

wherein $R^2$ and $R^3$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy, or a radical having the formula

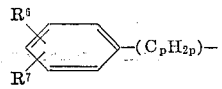

in which $p$ is a whole integer of 0 to 6 inclusive and $R^6$ and $R^7$ are alike or different and each represents hydrogen, (lower)alkyl, (lower)alkenyl, (lower)alkoxy, (lower)alkylthio, chloro, fluoro, bromo, iodo, trifluoromethyl, nitro or carboxy.

2. A compound of claim 1 having the formula

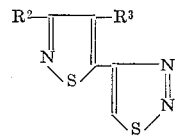

wherein $R^2$ represents hydrogen, (lower)alkyl or carboxy and $R^3$ represents hydrogen, chloro, fluoro, bromo, iodo, (lower)alkyl or carboxy.

3. A compound of claim 2 wherein $R^2$ and $R^3$ are hydrogen, and which has the formula

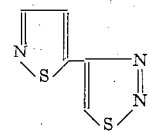

References Cited

UNITED STATES PATENTS

| | | | |
|---|---|---|---|
| 3,227,725 | 1/1966 | Eloy et al. | 260—302 |
| 3,262,940 | 7/1966 | McElroy et al. | 260—302 |

ALEX MAZEL, Primary Examiner

R. J. GALLAGHER, Assistant Examiner

U.S. Cl. X.R.

260—239.1, 243, 294.8, 295.5, 329, 332.2, 347.4, 455, 470, 471, 481, 516, 526, 561, 609; 424—246, 271